United States Patent [19]
Cook

[11] Patent Number: 6,005,041
[45] Date of Patent: *Dec. 21, 1999

[54] REINFORCED THERMOPLASTIC ELASTOMERIC GEL (RTEG)

[76] Inventor: Arnold J. Cook, 413 N. Pasadena Dr., Pittsburgh, Pa. 15215

[ * ] Notice: This patent issued on a continued prosecution application filed under 37 CFR 1.53(d), and is subject to the twenty year patent term provisions of 35 U.S.C. 154(a)(2).

[21] Appl. No.: 08/555,771

[22] Filed: Nov. 9, 1995

[51] Int. Cl.$^6$ ............................. C08K 3/00; C08K 3/08; C08K 3/10; C08K 3/24
[52] U.S. Cl. ........................ 524/435; 524/439; 524/442; 524/444; 524/445
[58] Field of Search ................................. 524/435, 439, 524/442, 444, 445, 448

[56] References Cited

U.S. PATENT DOCUMENTS

| | | | |
|---|---|---|---|
| 3,660,849 | 5/1972 | Jonnes et al. | 2/2.1 |
| 3,691,130 | 9/1972 | Logrinenko | 524/435 |
| 3,867,299 | 2/1975 | Rohatgi | 252/62.54 |
| 4,219,452 | 8/1980 | Littlefield | 260/3 |
| 5,446,085 | 8/1995 | Bradshaw | 524/507 |
| 5,602,197 | 2/1997 | Johnson et al. | 524/275 |

*Primary Examiner*—Nathan M. Nutter
*Attorney, Agent, or Firm*—Ansel M. Schwartz

[57] ABSTRACT

A novel, flexible composition is disclosed which contains reinforcement encased in intimate contact with a melt blended mixture of low durometer polymer gel. The reinforced polymer has unique properties obtained from the combination of reinforcement and elastomeric gel. Density, thermal conductivity, flexibility, elongation and strength are some of the properties which may be tailored by modifying the reinforcement and polymers. The combination of reinforcement with thermoplastic and oil create a gel and allows for deformation and impact resistance not obtainable with standard elastomers including vinyl, rubber or silicon. The addition of reinforcement makes it possible to tailor the gels properties while still maintaining many of its unique attributes. Particulate reinforced parts can be formed into a desired shape and take on some of the properties of the reinforcement. They can be deformed during use, but because these elastomeric gels have a high elastic memory, they return to their original shape. In addition, fiber reinforcement can be used to block deformation in specific directions. These and other properties make this system ideal for many applications including weights, shock absorbers, medical devices, seals, etc.

7 Claims, 14 Drawing Sheets

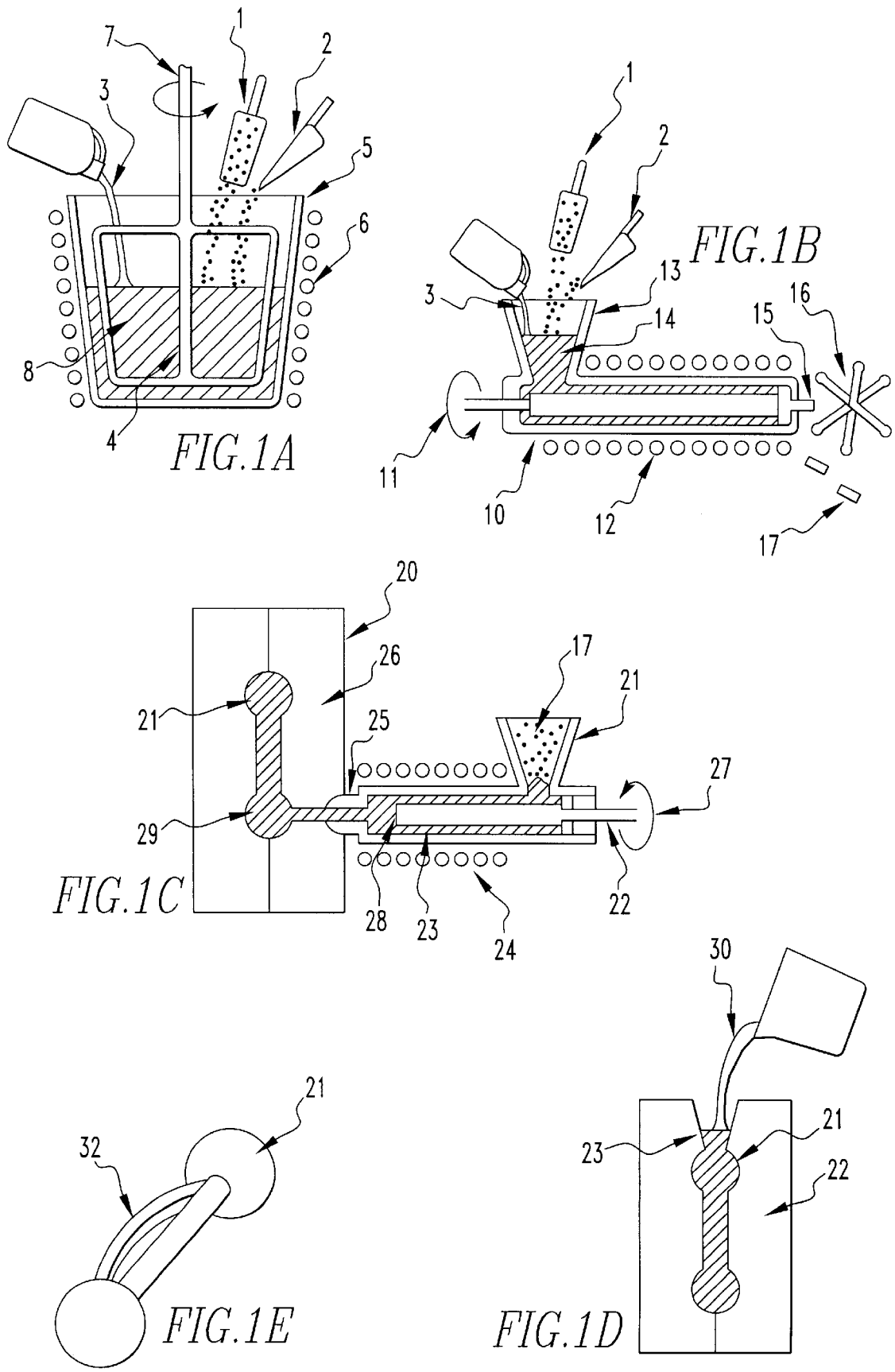

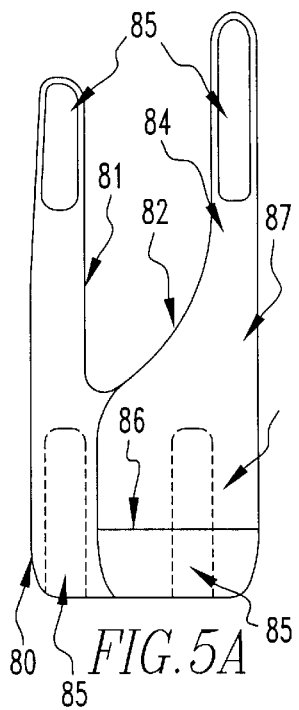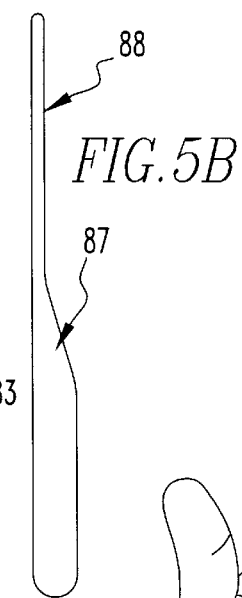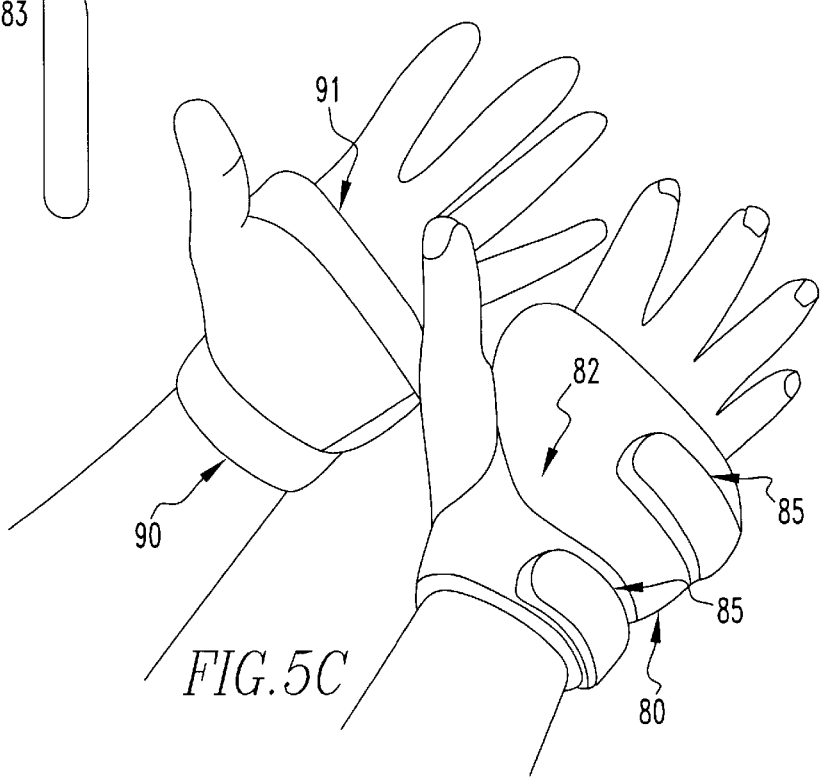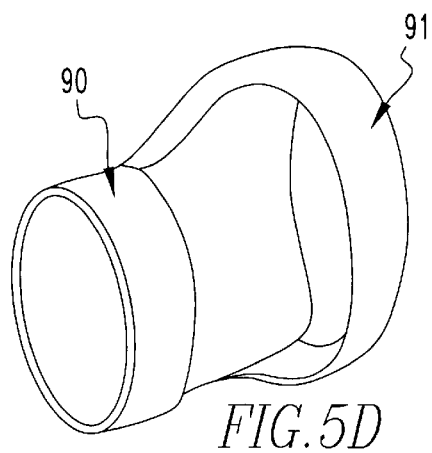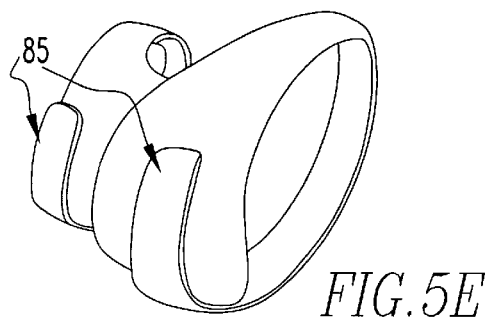

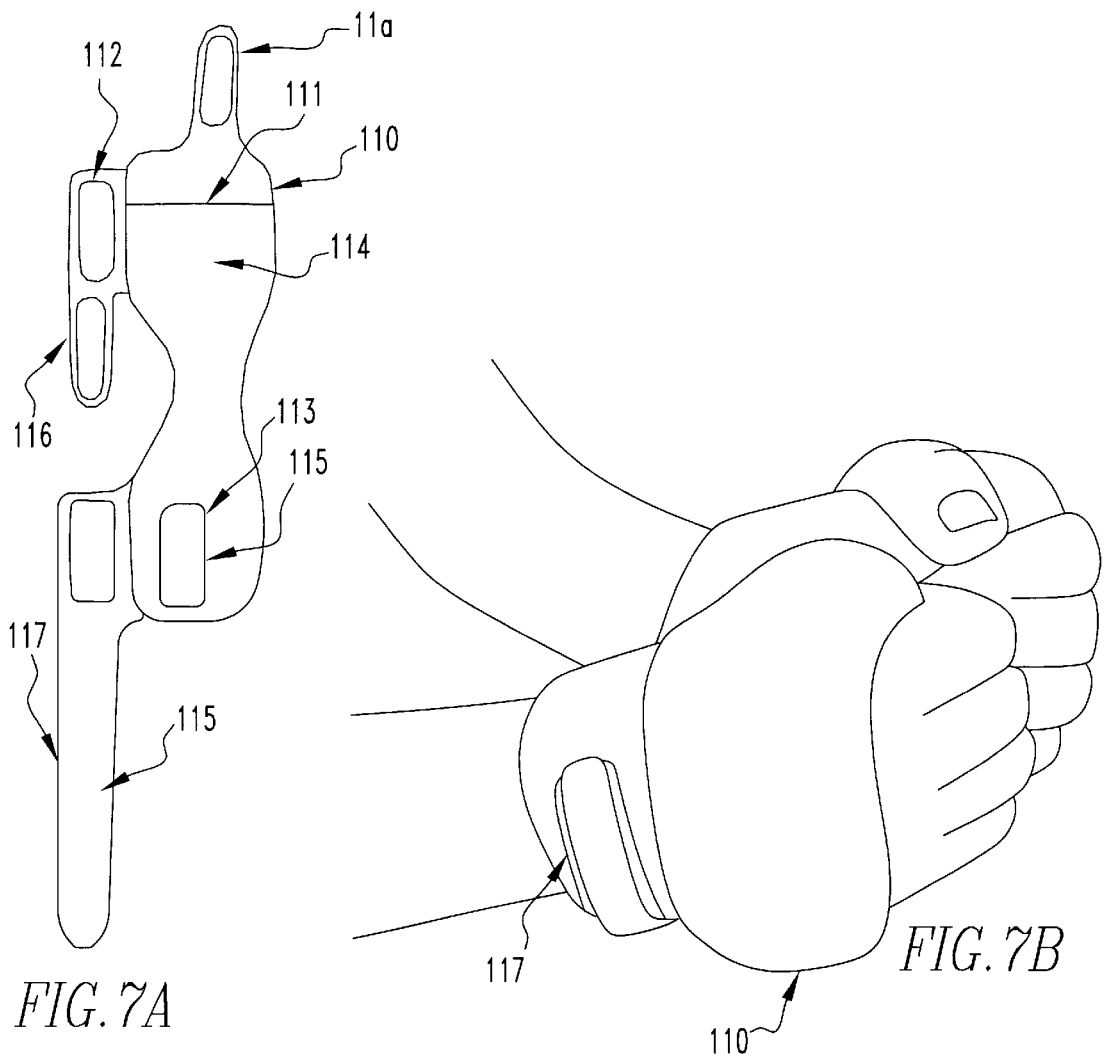
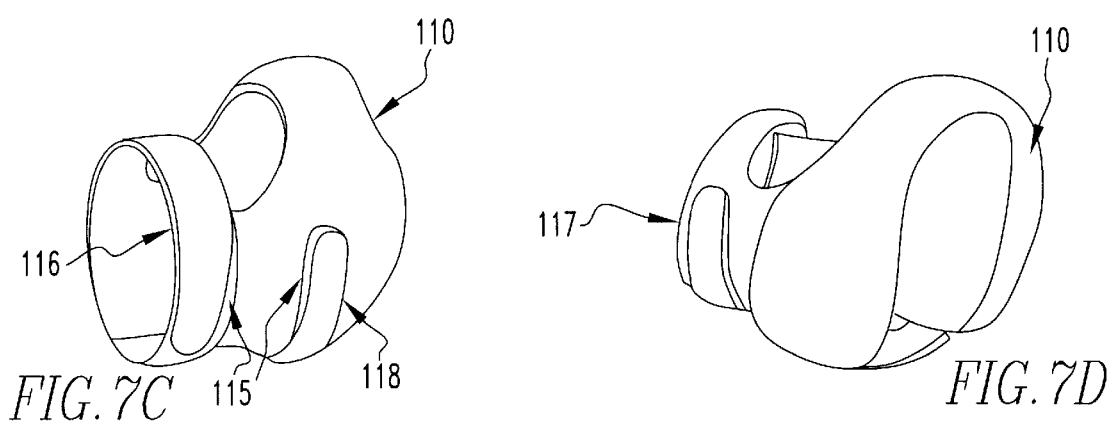
FIG. 7A  FIG. 7B  FIG. 7C  FIG. 7D

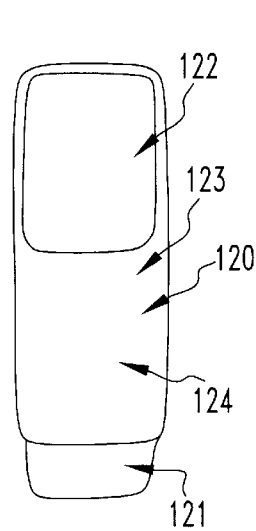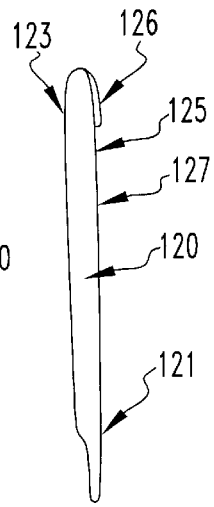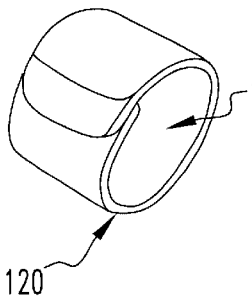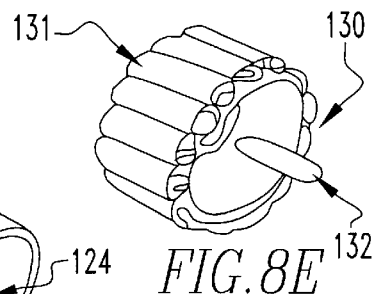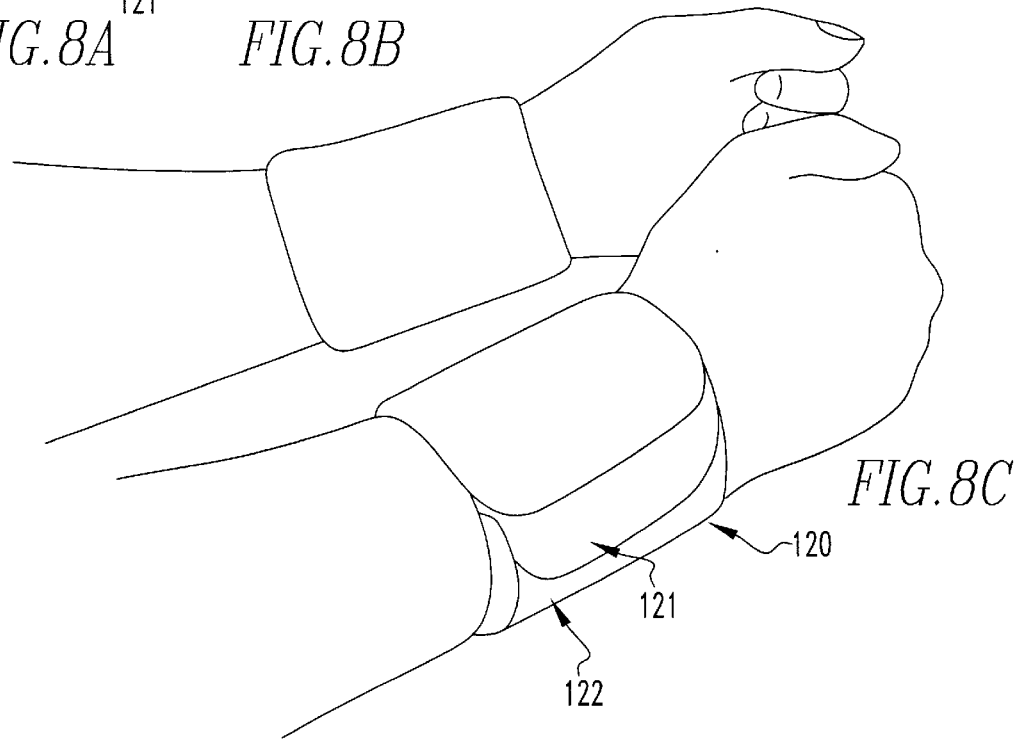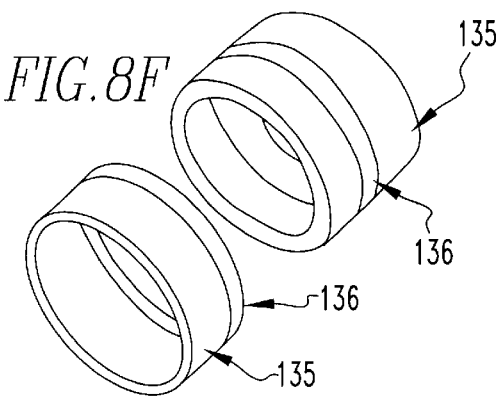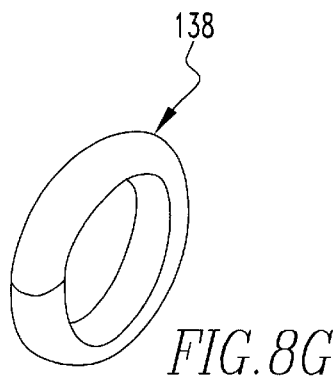

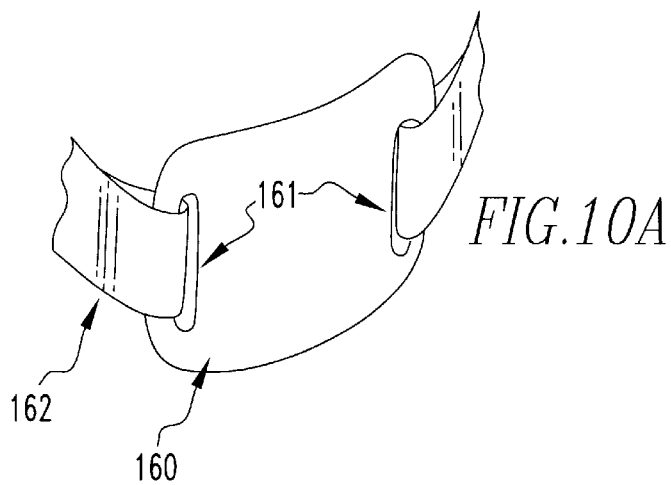
FIG.10A
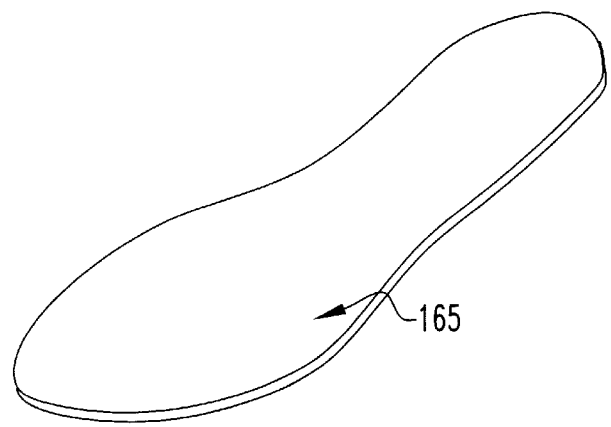
FIG.10B
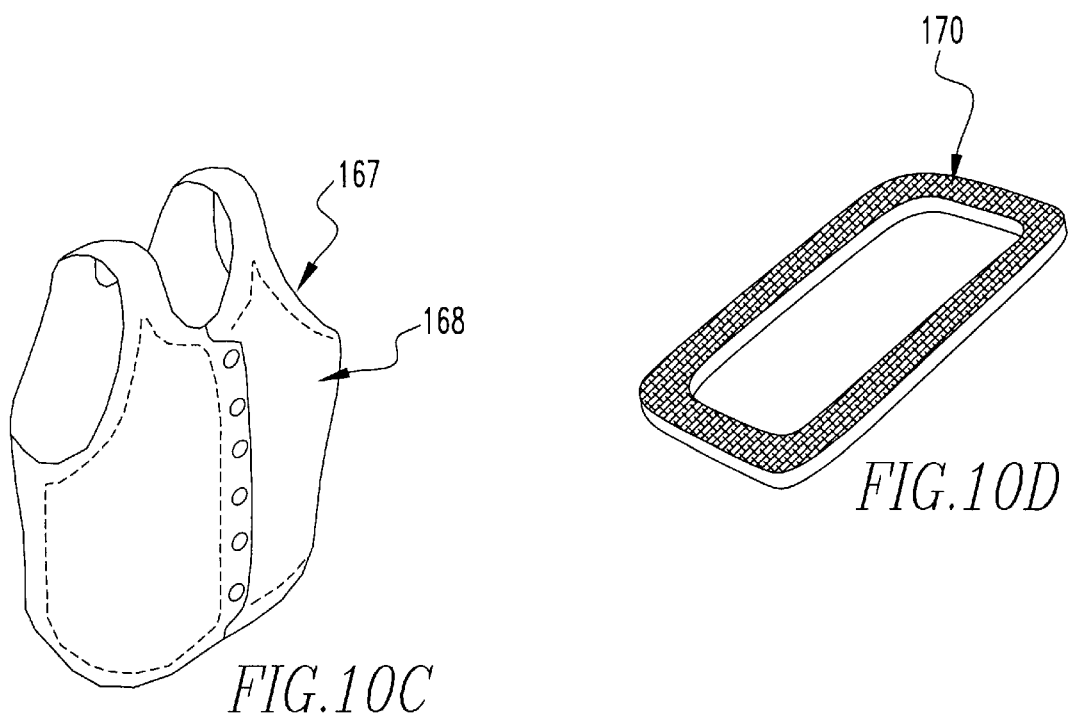
FIG.10C
FIG.10D

REINFORCED THERMOPLASTIC ELASTOMERIC GEL (RTEG)

CROSS-REFERENCE

This application is related to contemporaneously filed U.S. patent application Ser. No. 08/555,772, titled, "Concealable Arm and Leg Weight", by Arnold J. Cook, having attorney docket number AC-2 incorporated by reference herein.

FIELD OF THE INVENTION

The present invention relates to polymer composites of elastic materials such as those that can be produced by adding metal, ceramics or other reinforcements such as graphite or kevlar fibers to create composite compositions that are soft, flexible structures.

BACKGROUND OF THE INVENTION

There are many applications where the current elastomers available do not provide the required properties. Typical elastomers available from companies such as General Electric, Dow Chemical, and Shell Chemical, have densities below one gram per cubic centimeter, durometers from 5 to over 100 shore A, a wide range of tear resistance, and elongation percentages from 10 to over 2,000. All these properties are interrelated so that it is difficult or impossible to select a given combination of properties, or to have more than one property in different directions.

A few elastomer composites have been produced in the past, mostly with thermoset polymers. For example, silicon rubber has been used as switch contacts with the addition of graphite to carry current. Metal shot has also been mixed in polymers. The polymers tend to break or shear away from the metal shot during elastic deformation. These materials also tend to lose their shape after deformation. The present invention solves this and other problems associated with this and prior art compositions.

This invention provides the designer the ability to tailor the material for a given application and makes it possible to have different combinations of properties than those provided by current unreinforced elastomers.

SUMMARY OF THE INVENTION

The present invention provides a highly stable, excellent crack, tear and creep resistant composite material where the polymer and reinforcement do not separate during deformation. In addition, the composite allows for repeated flexing and deformation without degradation.

The composite is a thermoplastic mixed with oil to form a gel with a durometer below 50 shore A which can be readily injection molded and recycled. In the past, low durometer gels required vulcanization and could not be recycled. Another important aspect of the invention is that non-toxic systems can be produced so long as non-toxic reinforcements are used. Materials produced can be tailored to a desired level of flexibility or softness depending on the level, combination and form of the reinforcements added. For example, metal particles may be added to create an electromagnetic shield, which is flexible and easily conforms to an electronic device requiring shielding or ceramic abrasives may be added to create a flexible sanding block which conforms to a surface and may be used to grind and polish hard materials such as metal or stone.

Fibers in one or two directions may be added to block elongation while still maintaining Z axis deformation. Fibers may be required in the case of a shock absorbing pad to prevent the polymer from being extruded during deformation. Many types of fibers and weaves may be used as reinforcement. For example, Kevlar™ fiber may be formed into the elastomeric gel to act as a support mechanism for the woven material. This type of system may be used for impact resistance, for example, a bullet proof vest which is soft and flexible can be produced with internal kevlar layers to stop a bullet from penetrating while the elastomeric gel helps to absorb the shock, and provide flexibility to allow the system to conform to a person's body. Many other material may be developed for a wide variety of applications with this invention.

DESCRIPTION OF THE DRAWINGS

FIGS. 1A through 1E show the process of mixing, pellatizing, casting and injection molding of a reinforced thermoplastic elastomeric gel.

FIGS. 5A through 5E show a palmless hand weight formed of a thermoplastic elastomeric metal composite with a cloth covering.

FIGS. 7A through 7D show a hand weight which wraps around the hand and includes a wrist strap to attach the weight to the arm.

FIGS. 8A through 8G show a wist weight system comprising of a thermoplastic elastomeric composite weight in a flexible covering.

FIGS. 10A through 10D show a number of different applications for thermoplastic elastomeric gel composites.

DESCRIPTION OF THE PREFERRED EMBODIMENT

Figure 2A:
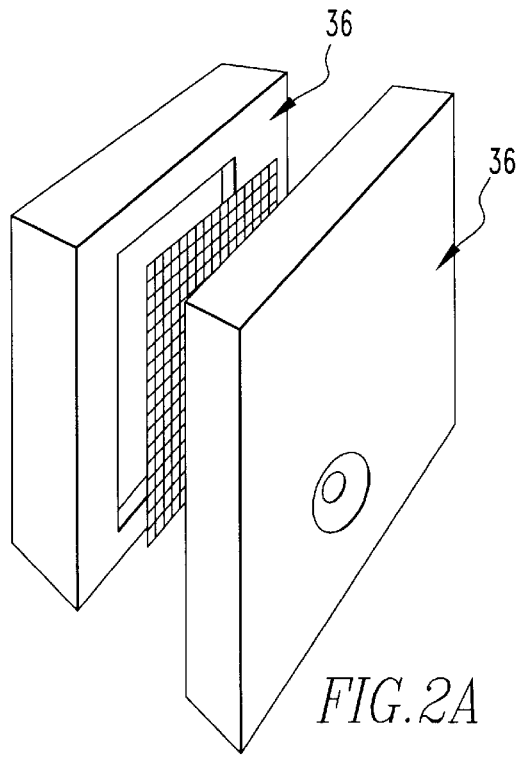
FIGS. 2A through 2D show a process of forming a fiber reinforced elastomeric gel composite by infiltration.

The following figures show a number of preferred embodiments for production methods, systems, and applications for reinforced thermoplastic elastomeric gels.

FIG. 1 shows the process of mixing, pellatizing, casting and injection molding of a reinforced thermoplastic gel.

FIG. 1A shows the compounding of reinforcement (1) with thermoplastic elastomer (2) and oil (3) into a planetary mixer (4) which has a heated chamber (5) with temperatures controlled heating elements (6). The mixing blade (7) turns and compounds the ingredients into a dispersed liquid polymer composite (8). This operation may be done in the planetary mixer (4) shown or it may be conducted in a single or twin screw mixer. The compounding is done just above the melting temperature of the thermoplastic. It is helpful to preheat the reinforcement near or above the mixing temperature prior to mixing, especially in the case of metal fillers.

FIG. 1B shows the mixing and pellatizing of a reinforced thermoplastic elastomeric composite. Pre-compounded material may be used as produced in FIG. 1A or the material may be mixed and extruded in a continuous mixer (10) which has a screw (11) which is heated above the melting point of the thermoplastic by heaters (12). Reinforcement (1), thermoplastic (2), oil (3) and any other additives such as colors or stabilizers may be added to the input hopper (13) such that the unmixed contents (14) are compounded as the screw (11) turns. Compounded material (15) is extruded out the end of the continuous mixer (10) and is cut by a rotating blade (16) into pellets (17). These pellets my be used to feed an injection molding machine, or liquid compounded material as shown in FIG. 1A or FIG. 1B may be fed directly into a casting mold or a low pressure casting machine.

FIG. 1C shows a cross section of an injection molding machine (20) being used to form a dumbbell (21). Pellatized material (17) is fed into the hopper (21). The feed screw (22) forces the material into the barrel (23) where it is heated by electric band heaters (24) to a temperature above the melting point of the polymer. The nozzle (25) is held against the injection mold (26). The screw (22) is then pushed forward with a hydraulic ram (27) such that the heated composite (28) is forced into the die cavity (29) to form the dumbbell (21). After the dumbbell (21) solidifies it may be removed from the injection mold (26).

FIG. 1D shows an alternative method for forming the same dumbbell (21) by forming a pourable low viscosity composite mixture (30) and pouring said composite mixture (30) into a casting mold (22) to form a dumbbell (21) through pouring port (23). After the dumbbell (21) is solidified it may be removed from the casting mold (22). The material compounded in FIG. 1A may be poured or forced directly into a casting mold without solidifying or pellatizing the material first.

FIG. 1E shows an orthographic view of a dumbbell (21) which may be formed with a handle (32). With the injection molding or casting process, very complex shapes may be formed, which otherwise would be difficult and expensive to create in metal.

FIG. 2 shows a process of forming a fiber reinforced elastomeric gel composite by infiltration.

FIG. 2A shows a plate injection mold (35) into which a woven fabric (36) is placed. This fabric may be made of metal, plastic, natural fibers, or synthetic fibers such as Kevlar™. Multiple layers of one or more materials may be used. The plate injection mold (35) is then closed.

Figure 2B:
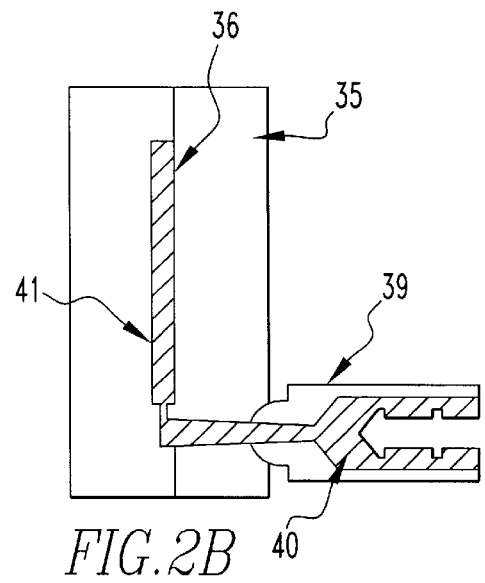

FIG. 2B shows plate injection mold (35) closed in an injection molding machine (39) such that liquid thermoplastic elastomer (40) is injected into the die cavity (41) where it surrounds and then infiltrates into the woven fabric (36).

Figure 2C:
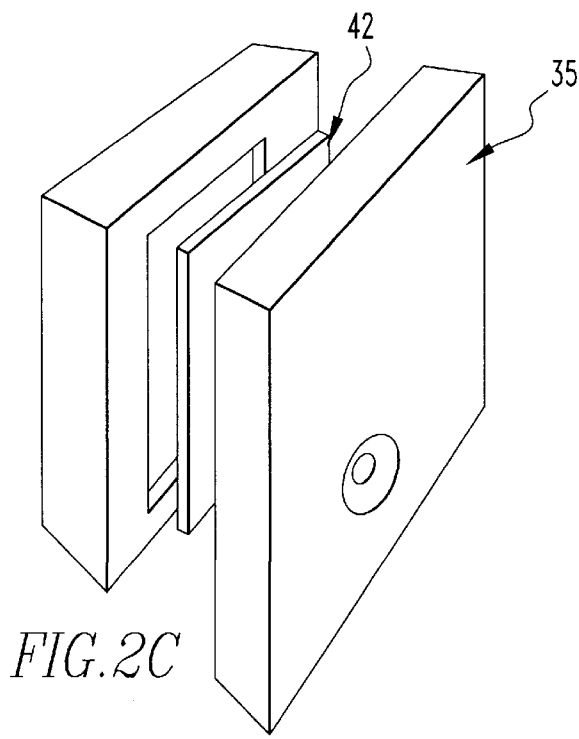

FIG. 2C shows the plate injection mold (35) being opened with a formed fabric elastomeric composite sheet (42) being ejected from the mold.

Figure 2D:
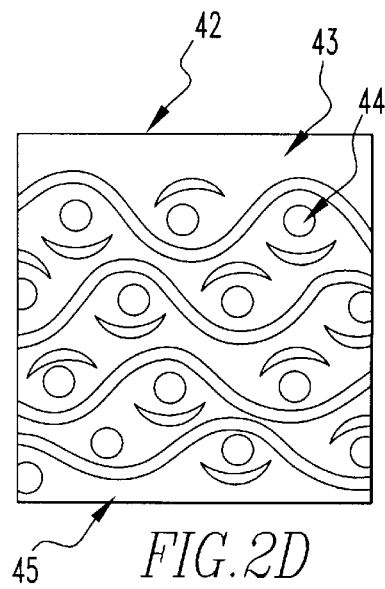

FIG. 2D shows a microstructural cross section of the fabric elastomeric composite sheet (42) showing solidified elastomer (43) surrounding the woven fibers (44). It's interesting to note that by elevating the die temperature a skin of pure polymer (45) forms on the part. This occurs due to the flow of liquid polymer first around the woven fibers (44) prior to infiltration.

FIG. 3 shows a number of microstructural cross sections of different elastomeric composites.

Figure 3A:
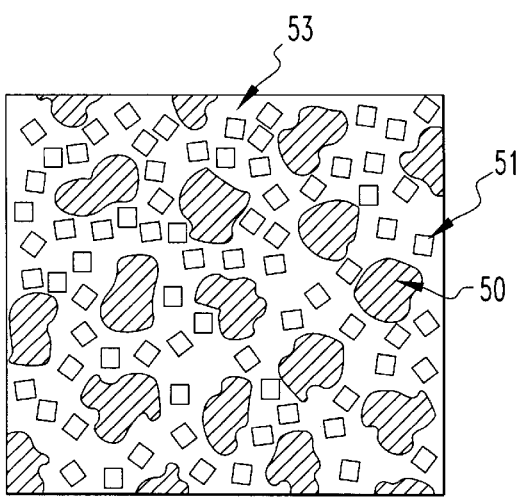
FIGS. 3A through 3F show a number of microstructural cross sections of different elastomeric gel composites.

FIG. 3A shows a microstructure with two different size particles, large particles (50) and a similar particles (51) in an elastomeric matrix (53). The large particles (50) and the small particles (51) may be of the same material type such as a metal, ceramic, glass or plastic or they may be of a dissimilar material. One or more size particles may be used to create a desired volume fraction of fillers. If spherical shape particles are used up to 65% volume fraction packing is theoretically possible. With irregular shaped single sized particles the maximum particle loading is approximately 50–55%. By using a bi-modal or multi-size distribution of particles, higher volume fractions may be obtained. In addition, by using a multi-size loading of fillers, the flow characteristics of the system may be altered. By using more than one particle size to create a given volume fraction, the system becomes more fluid than the same volume fraction made with only one particle size. Typically, particles need to be more than five times larger than the next smallest size particles for maximum packing but smaller differences may be used to lower the viscosity. Particle sizes from sub-micron to 300 micron may be readily mixed to form uniform flowable compounds which does not readily separate and can be easily injection molded.

Figure 3B:
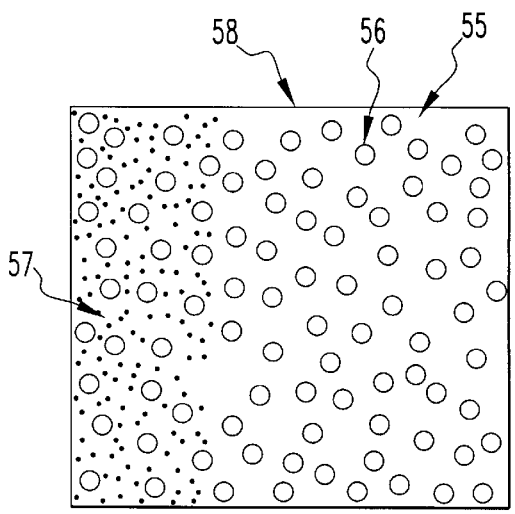

FIG. 3B shows the microstructure cross section of an elastomeric gel (55) containing spherical voids (56). The elastomeric gel (55) may also be reinforced with particles (57). This system (58) may be created by mixing in a foaming agent to create gas during the heating and injection molding process. One of these foaming agents is Celogen AZNP available from Uniroyal Chemicals in Connecticut. These additives may be put into the injection molding machine along with the pellatized composite. During heating, the foaming agent causes the formation of gas bubbles within the material. These spherical voids (56) may be used to add additional cushioning and effectively lower the gross durometer of a formed component. These spherical voids (56) may be used alone or in combination with any other reinforcement. A whole component may contain these spherical voids (56) or they may be controlled to only exist in a portion of a component. Spherical voids (56) may be used to lower the density, decrease thermal conductivity, hold gases or fluids, as well as lower or raise the effective gross durometer. To raise the systems gross durometer the spherical voids (56) must be pressurized.

Figure 3C:
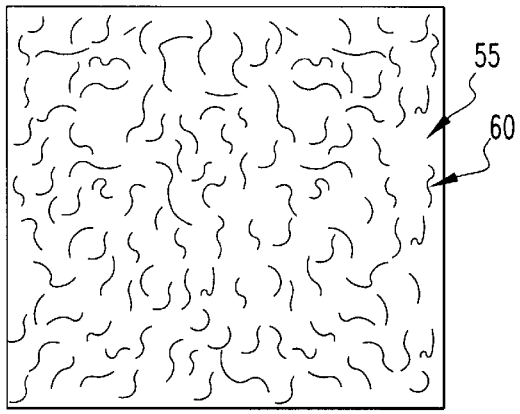

FIG. 3C shows an elastomeric gel matrix (55) reinforced with chopped fibers (60) randomly oriented throughout the elastomeric gel matrix (55). Chopped fiber reinforcement and particulate reinforcement may be loaded loosely into the mold or they may be preformed into a shape that is the same or different than the component to be formed and then loaded into a mold and then infiltrated.

Reinforcement may be added to the elastomer and then injected into a mold or the chopped fiber or particulate may be placed into a mold and then infiltrated. When the chopped fiber or particulate is placed into the mold, it may be done in a loose form or as a preformed body. A preform of a chopped fiber or particulate or a combination of both may be formed by pressing, vacuum forming, slip casting, injection molding, including flow agent removal. A preform holds its shape either by mechanical or physical attraction of the particles or with binders used to tack or hold the fibers or particles together, or by a combination of these systems. Preform infiltration allows for reinforced and unreinforced areas, making it possible to produce components with different physical properties in different locations. For example, a weight may be created by first forming metal particles into a preform and then infiltrating the preform in the mold such that selected areas have no metal particles. For example, a weight of composite material may be formed with a durometer of 40 while straps formed at the same time are left unreinforced and may have a durometer of 20 or that of the elastomeric gel matrix. Preforms and other inserts make it possible to tailor specific areas of a component to have different properties and serve different functions.

Figure 3D:
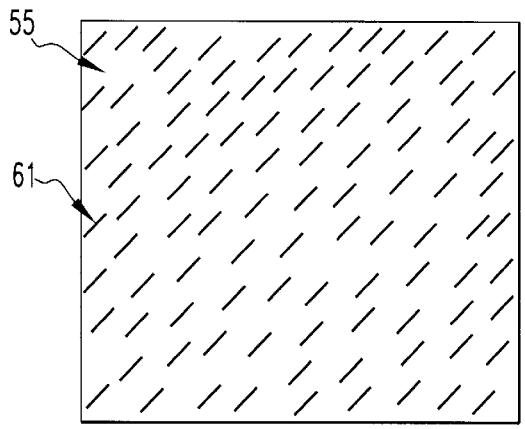

FIG. 3D shows an elastomeric gel matrix (55) with uni-directional fibers (61). These fibers (61) may be run in one or more directions to add stiffness or other properties as desired.

Figure 3E:
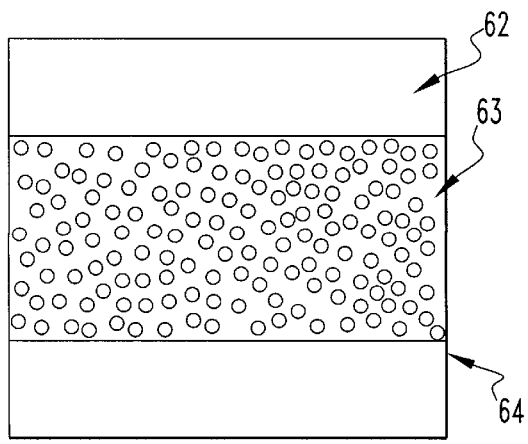

FIG. 3E shows a microstructural cross section with unreinforced elastomeric gel (62) on the outside of a reinforced elastomeric gel composite (63). This system (64) may be formed at one time through the use of a preform or this system may be formed by co-injection molding of two materials simultaneously or by insert molding where the composite component already formed and solidified, is placed inside an injection mold. An additional material either polymer or composite is injection molded around it. In this way, an elastomeric gel material may be formed in or as part of another component made of a different thermoplastic or thermoset. This other material may be rigid such that thermoplastic composite elastomer forms a hinge, seal or dampener in the component.

Figure 3F:
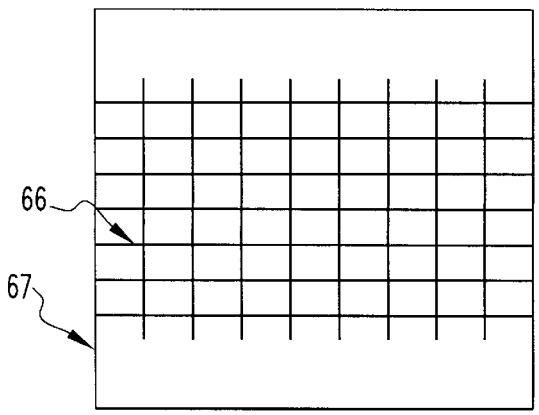

FIG. 3F shows a microstructure cross section with a metal insert (66) inside an elastomeric gel (67) in the form of a mesh. This mesh may be used to support a shape and prevent flexure or elongation in certain directions. This mesh can also be comprised of a plastic or polymer coated metal.

The elastomeric gel may contain many different types of additives such as ceramics, metals, and different forms of carbon. In addition to these basic materials, the elastomeric gel may be designed to exude materials such as oils or medicines such as hydrocortisone, steroids, etc. These medicines may be used to treat skin conditions or other conditions through the skin or they may be used to supply constant or time released materials to another object.

Figure 4:
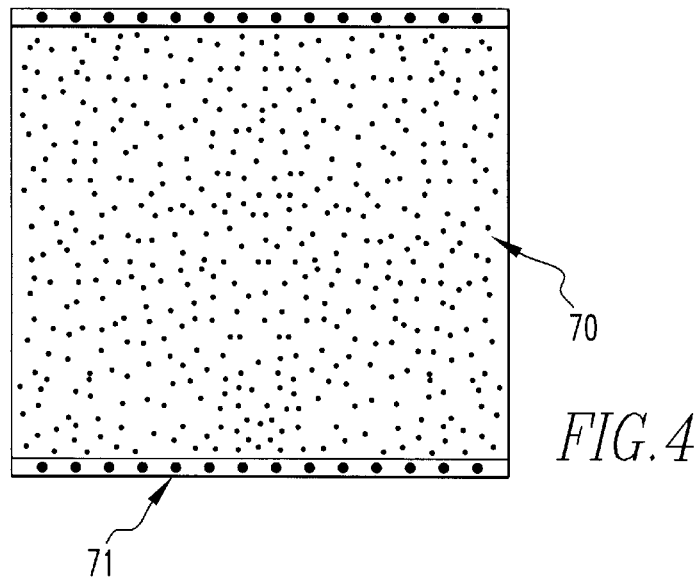
FIG. 4 shows the microstructure cross section of a thermoplastic elastomeric gel composite and cloth skin.

FIG. 4 shows the microstructure cross section of an elastomeric composite (70) with a cloth exterior cover (71). The cloth may be sewn into a shape and then the elastomeric composite may be placed inside or the elastomeric composite material may be cast directly into a cloth shape. In an alternative embodiment, the cloth may be ironed onto the elastomeric composite material by melting the surface of the composite such that the polymer infiltrates slightly into the cloth to bond the two structures together. In addition to cloth or leather, coatings may be applied to the outside of the polymer composite through spraying or dipping operations to create a skin. This skin may be used to protect the composite or to add different properties or feels to the material.

FIG. 5 shows a palmless hand weight formed of an elastomeric metal composite with a cloth covering.

FIG. 5A shows a flattened view of a knuckle weight (80). Knuckle weight (80) has a wrist section (81) and a weight section (82). The weight section (82) contains an elastomeric gel mixed with iron powder (83). The weight section (82) is covered with an elastic cloth (84) such as Lycra/Spandex. The wrist section (81) may be of the same material or may be padded inside with fleece or other material for added comfort. Hook and loop material (85) is used at the end of the straps and on the body of the strap section (81) for attachment. An overlap seam (86) makes it possible to slide the weight (87) into the weighted section (82). Many different durometer thermoplastic elastomers may be used. In the preferred embodiment, the thermoplastic is mixed with an oil such that the composite has a durometer below 2 shore A for comfort.

FIG. 5B shows the same flattened knuckle weight (80) from the side. The weight (87) tapers down and ends in the strap section (88). This tapering allows the weight to easily conform into the palm and makes it possible to hold things in the hand while wearing this weight.

FIG. 5C shows the knuckle weight (80) on the left and right hand with the wrist strap (90) around the wrist and the palm strap (91) around the palm. The hook and loop material (85) can be seen attaching the knuckle weight (80) around the hand. Weight material may be contained in the wrist section (81) as well as the weight section (82). The knuckle weight (80) may be worn comfortably while driving, exercising or any activity which requires the use of the hands, fingers and palm. The weight (81) may be adjusted in size and density by changing fillers or the volume fraction of filler in the elastomeric matrix. Pockets may also be included to insert additional weight. Also, weights may be removed and replaced with different weight amounts. Weights from ½ to 7 lbs. can easily be created which are soft and comfortable. The weights may be washed with or without the cover.

FIG. 5D shows a view of the knuckle weight (80) without the hand showing the wrist strap (90) and the palm strap (91) wrapped around and attached to hold the knuckle weight (80) on the hand.

FIG. 5E shows the opposite side of a right hand weight with the hook and loop attachment (85). In addition to hook and loop materials, snaps and other mechanical fasteners may be used alone or in combination with a D-ring or other tightening means.

FIG. 6 shows a palm weight which wraps around the front and back of the hand without attachment to the wrist.

Figure 6A:
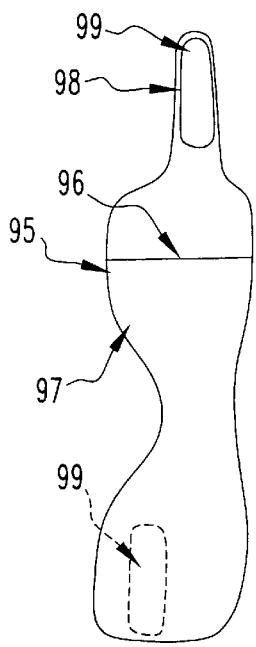
FIGS. 6A through 6E show a palm weight which wraps around the front and back of the hand without attachmment to the wrist.

FIG. 6A shows a flattened view of the palm weight (95) which narrows to go around the hand between the thumb and first finger. The palm weight (95) has an overlap slot (96) through which the weight is inserted into a cloth covering (97). This overlap slot (96) may have hook and loop material or other closures or may be left as overlap only. The palm weight (95) includes an attachment strap (98) with hook and loop material (99) attached to the strap and palm area of the weight.

Figure 6B:
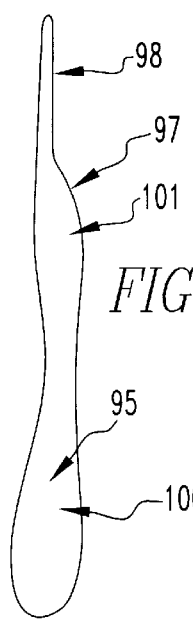

FIG. 6B shows a side view of the same flattened palm weight (95). The section that fits into the palm (100) is thicker and the palm weight (95) thins down to the strap (99). The weight (101) inside the cloth covering (97) may be extended into the strap (99) or stop before the strap (99).

Figure 6C:
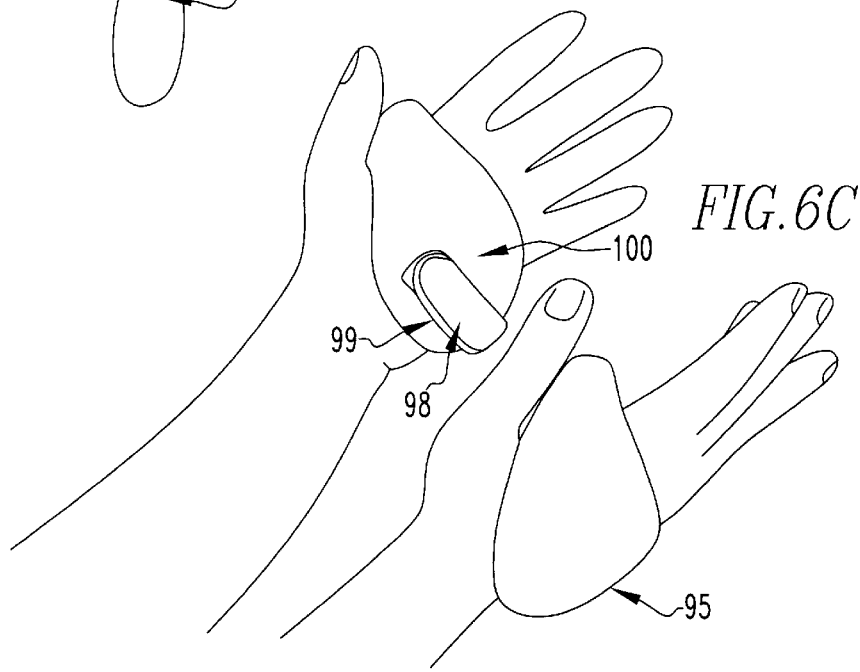

FIG. 6C shows the palm weights (95) in a left and right hand version being worn. The inside of the weight may or may not contain a stiffener to help hold the weight in position. The use of a stiffener depends on the stiffness of the composite and the softness desired. The strap (98) is attached to the palm section (100) and may be adjusted easily with the hook and loop material (99).

Figure 6D:
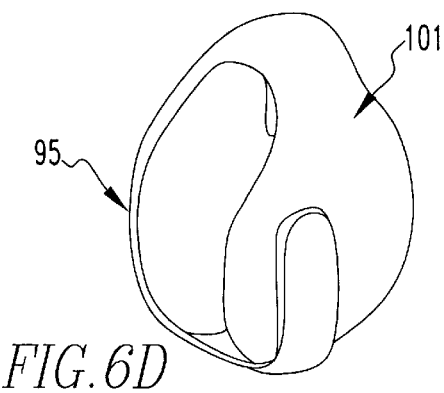

FIG. 6D shows the palm weight (95) without the hand. The weight (101) may be a thermoplastic elastomer mixed with iron particles between 1–300 microns from 5–75% volume fraction to form a flexible soft weight.

Figure 6E:
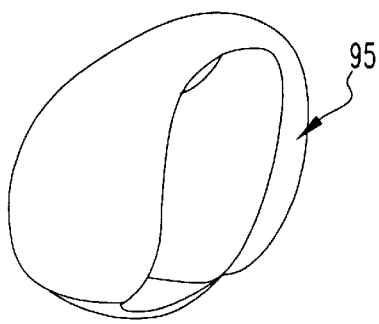

FIG. 6E shows the opposite side of the right hand weight where FIG. 6D showed the left hand weight. The weight (95) may be designed to fit either hand, however, ergonomically, more comfort may be obtained by sculpting a mirror form for the right and left hands. In addition, one or more compartments may be put into the cloth covering or the weight itself to hold other objects such as additional weight, a watch, water, tissue, etc., items which may be of value during exercise.

FIG. 7 shows a hand weight which wraps around the hand and includes a wrist strap to attach the weight to the arm.

FIG. 7A shows a flattened version of a hand weight (110) which has a flexible weight (111) and a wrist section (112). The weight section (111) is basically the same as shown in FIG. 6 but has a wrist strap attached to both the palm section (113) and the back of the hand section (114). The wrist section (112) may include one or more straps to attach the weight to the wrist while the weight section (111) may also have one or more straps to attach it to the palm section (113). In the flattened version shown, two straps with hook and loop material (115) exist. The back of the hand section (114) has a strap (116) which goes over the wrist behind the thumb and another strap (117) which wraps around the wrist to finish the attachment. Either strap may be made long enough to totally surround the wrist and attach the weight. The weight section (111) also has a strap (118) to attach to the palm section with hook and loop material (115) to the palm section (113).

FIG. 7B shows the hand weight (110) being worn with a left and right hand version. The wrist strap (117) can be seen attached.

FIG. 7C shows the left hand weight (110) without the hand. The thumb section of the wrist strap (116) as well as the weight strap (118) can be seen attached to each other. These straps may be used alone with hook and loop material (115) to attach the weight to the hand or they may be used in combination with other fasteners and tighteners such as D-rings or locking mechanisms.

FIG. 7D shows the right hand weight (110) and the attachment strap (117).

FIG. 8 shows a wrist weight system comprising of an elastomeric composite weight in a flexible covering.

FIG. 8A shows a flattened version of a wrist weight (120) including a hook and loop material (121) and loop material (122) available from Velcro™ on the outside of the cloth covering (123) used for attachment and adjustment. Inside the cloth covering (123) is a flexible thermoplastic elastomeric composite weight (124) containing lead, iron, or tungsten or another heavy filler.

FIG. 8B shows a side view of the flattened weight (120) which shows a uniform profile (125) and the attachment hook and loop material (121). On the inside surface of the weight (120) is an overlap slot (126) which allows the weight to be slid into the cover (123), alternatively, the weight may be sewn inside without the ability to be removed. In addition, a perspiration absorbent pad (127) may be positioned on the inside to provide additional sweat removal, thermal insulation and padding.

FIG. 8C shows the flexible wrist weights (120) being worn on the wrist. The hook and loop overlap material (121) can be seen attached to the loop material (122). Additional strapping may also be used when the weight exceeds more than a few pounds. Weights from ¼ to ten pounds may be easily made and attached with this system.

FIG. 8D shows a weight (120) without the arm which is a uniform thickness. The amount of weight may be increased by overlapping one weight (120) on top of another or by changing the weight insert (124) to one with a higher density.

FIG. 8E shows another version of the wrist weight (130) with individual pockets (131) into which composite weight inserts (132) may be inserted. Varying the number and the density of these inserts (132) makes it easy to adjust the weight amount with this system.

FIG. 8F shows a weight (135) which includes a hook section (136) which allows weights to be attached to each other as shown in FIG. 8G, where the hook material (136) is used to attach one or more weights (135) together.

FIG. 8G shows a semi-round cross sectional weight (138). Weights may be designed with many different shapes as required to obtain the desired weight and comfort for a given location on the body.

FIG. 9 shows the system of leg and shoe weights.

Figure 9B:
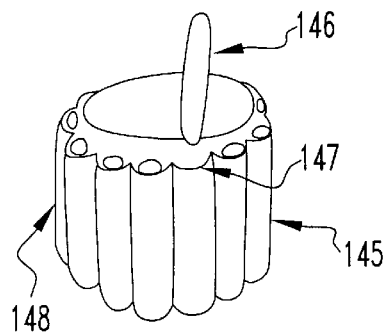
FIGS. 9A through 9E show the symbol of leg and shoe weights.
Figure 9A:
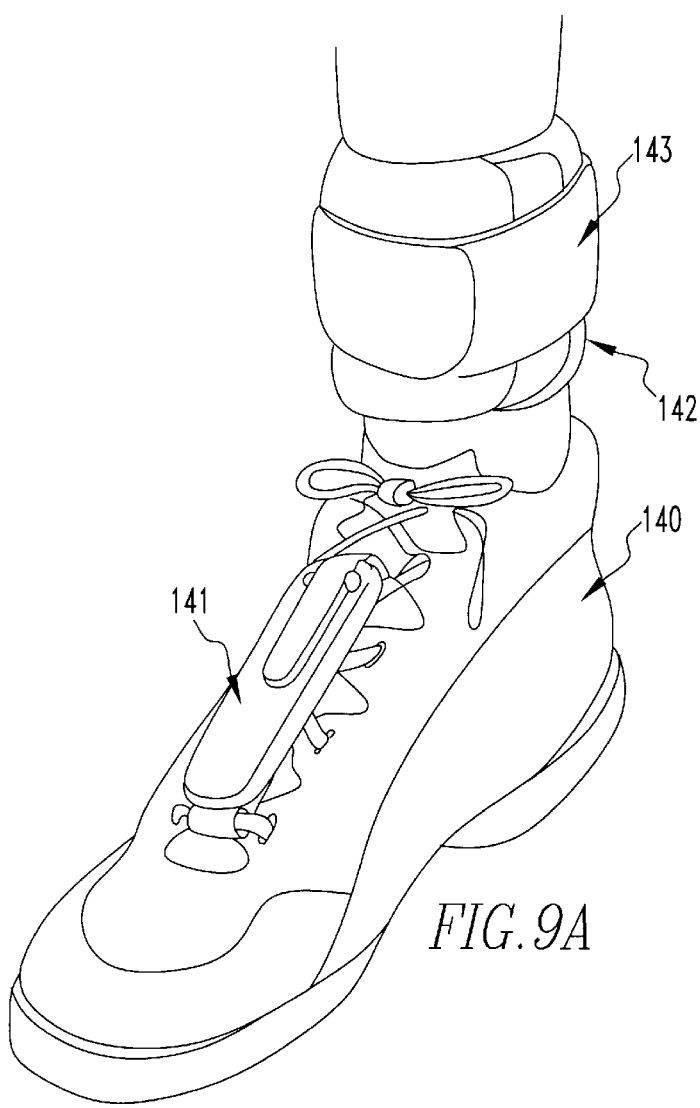

FIG. 9A shows a leg and foot with a tennis shoe (140). Attached to the laces of the shoe is a flexible composite weight (141) and attached to the ankle is a flexible composite weight (142). The flexible composite weight (142) is similar to the wrist weight (120) shown in FIG. 8 and it may include a holding strap (143) to maintain its position around the ankle.

FIG. 9B shows another version of an ankle weight (145) which includes flexible weight inserts (146) which fit into pockets (147) in a cloth covering (148).

Figure 9C:
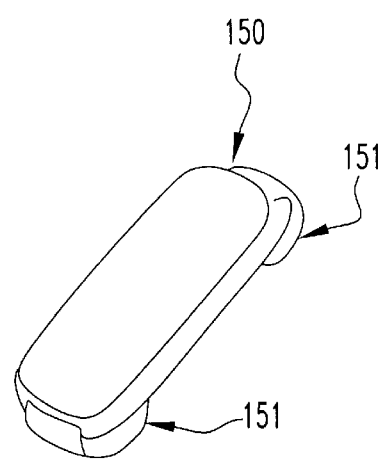

FIG. 9C shows a shoe weight (150) which includes hooks (151) which slips under the laces to secure the weight (150) on the shoe.

Figure 9E:
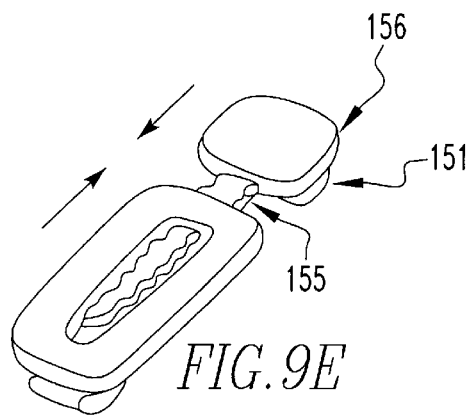
Figure 9D:
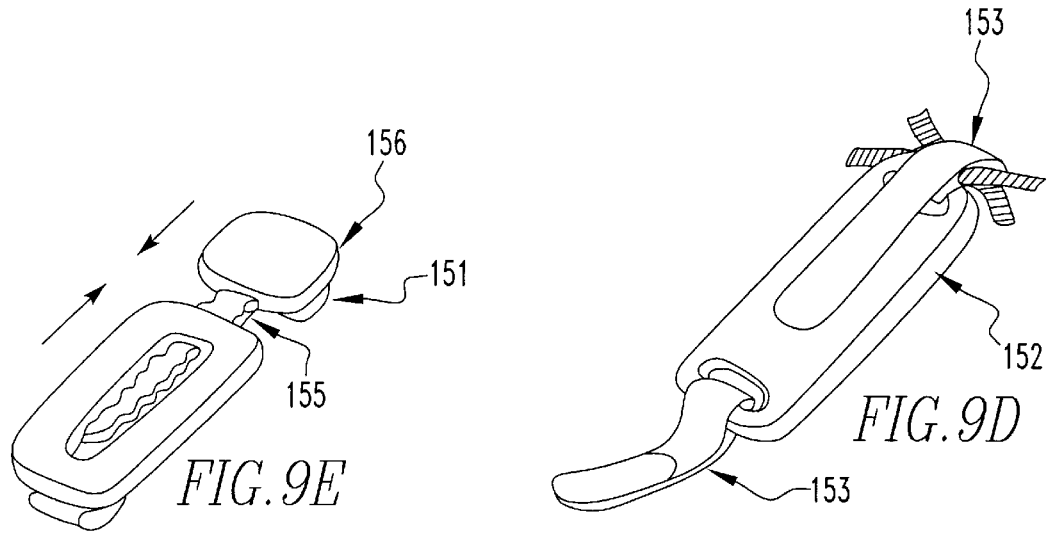

FIG. 9D shows another shoe weight (152) which includes two hook and loop straps (153) which can be threaded through the laces to hold the weight in position. Straps (153) and hooks (151) may be used in combination to attach a weight to a shoe. In addition, a strap may be positioned around the shoe to hold the weight in place. Such a strap may go from the top of the arch around the foot between the heel and the bottom of the arch to attach the weight.

FIG. 9E shows another design which includes a slip-lock mechanism (155) which can be used to lock a weight (156) containing hooks (151) to attach onto the laces of a shoe.

FIG. 10 shows a number of different applications for elastomeric gel composites.

FIG. 10A shows a simple plate weight (160) made of an elastomeric gel composite which may be attached to another object. The weight (160) includes slots (161) into which attachments (162) may be joined. These attachments (162) may be mechanical or may be hook and loop material.

FIG. 10B shows a shoe insert (165). This insert may be a particle or fiber reinforced gel to act as a cushion and/or an exercise weight.

FIG. 10C shows a vest (167) with elastomeric gel composite (168) sewn into it. This elastomeric gel composite (168) may act as a weight for exercise or it may contain layers of kevlar fibers for impact protection and may function as a soft bullet proof vest.

FIG. 10D shows a pressure and/or vacuum seal (170) made of an elastomeric gel composite containing fiber reinforcement (171). This reinforcement provides additional compression strength and prevents the seal from being extruded during clamping. This type of reinforcement for seals is ideal for applications requiring very low durometer seals and low sealing pressures.

FIG. 11 shows a number of other applications for a reinforced elastomeric gels.

Figure 11A:
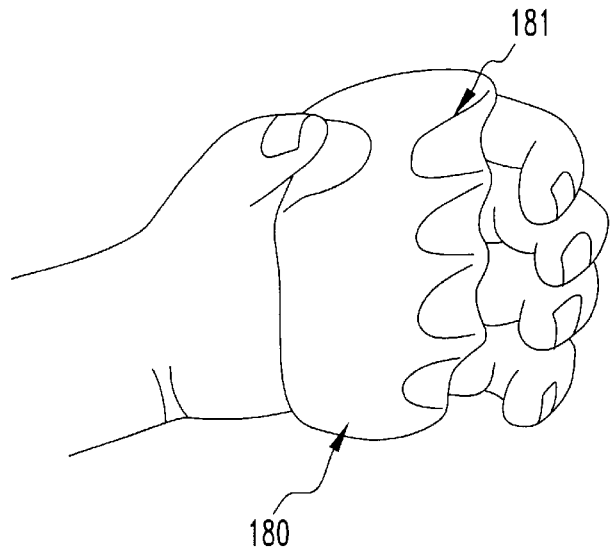
FIGS. 11A through 11C show a number of different applications for a thermoplastic reinforced elastomeric gels.

FIG. 11A shows a hand exerciser (180) formed from elastomeric gel with reinforcement added to affect the durometer. Reinforcement such as gas bubbles may be added to decrease the durometer while other particulate and fiber materials may be added to change the durometer of the whole device or in specific locations of the device. The hand exerciser (180) is essentially a shock absorber which provides resistance when compressed. The hand exerciser (180) may be a simple geometric shape such as a rod, sphere, egg or it may contain recesses (181) to locate the fingers. In addition, the hand exerciser may be preheated or cooled to treat sore hands. Similar type exercisers may be designed for other jointed muscles such as the elbows, hips, knees, etc. In addition, weight reinforcement may be added for additional exercise potential. Metal may also be added to help provide good heat transfer so that the hand exerciser can also provide heating or cooling to the hand for muscle or joint therapy.

Figure 11C:
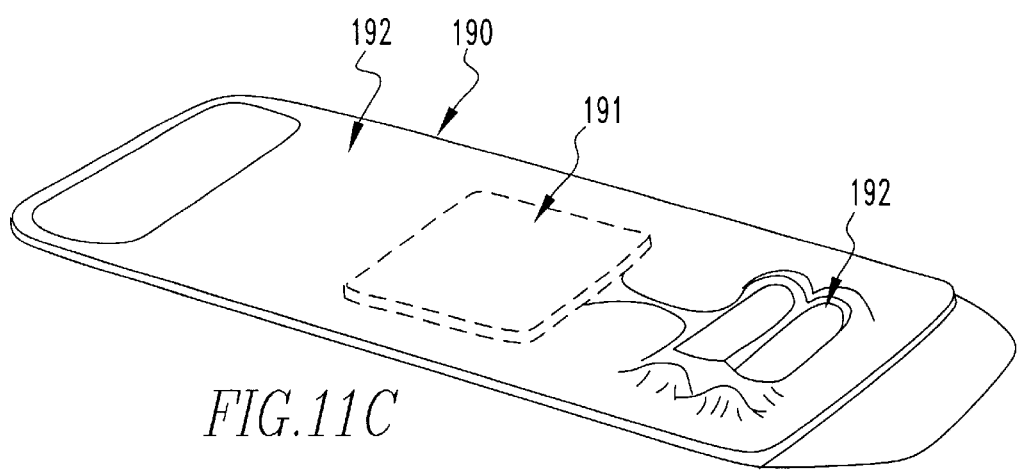
Figure 11B:
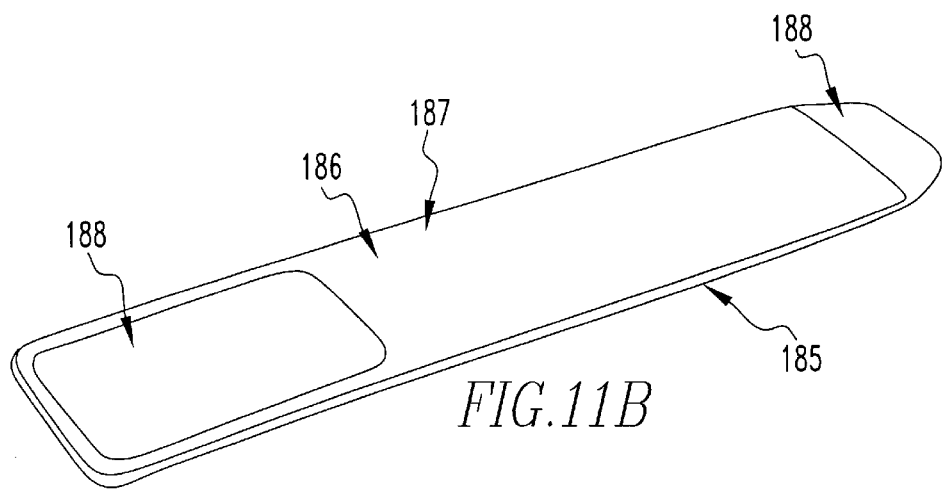

FIG. 11B shows a thermal ace bandage (185) containing an elastomeric/metal composite (186) covered with a fabric (187) including hook and loop material (188) to fasten the thermal ace bandage (185). Because of the heat capacity of the metal (its ability to hold and conduct heat), and the flexibility of the elastomeric gel, make the thermal ace bandage (185) an excellent replacement for a standard hot water bottle or ice pack. The elastomeric metal composite (186) in the cloth covering (187) may be placed directly into a refrigerator or freezer or cold water which will lower the temperature of the composite. Even at below 0° F. the composite still maintains its flexibility due to the oil in the gel. The thermal ace bandage (185) may then be attached to an object or sore muscle to raise or lower its temperature. The thermal ace bandage (185) is only one example. Complete clothing, thermal medical product and whole blankets can be produced with this material.

The thermal ace bandage (185) can be heated in an oven, microwave, or hot water and used to replace a hot water bottle with the unique ability to contour to an object. For example, the thermal ace bandage can contour to the neck and shoulders and provide continuous thermal treatment on the skin, unlike the more rigid hot water bottle. Depending on the thermal properties of the elastomeric gel and metal filler and the thickness or mass of the composite, the amount of time to release the heat and will vary. It is feasible to heat an object with a thermal ace bandage (185) from 60–120 minutes with a 30% volume iron reinforcement, ½ thick. Copper reinforcement will heat up faster while stainless steel reinforcement will heat up slower due to the difference in their thermal conductivities.

FIG. 11C shows a thermal ace bandage (190) with an embedded thermal electric (191). A thermal electric (191) may be a heater or a solid state refrigerator which conducts heat from one side of the device to the other. By positioning a thermal electric (191) on or in a metal reinforced elastomeric composite (192), the thermal electric (191) can effectively heat or cool on a continuous basis. The thermal electric (191)can run on a DC current which can be supplied by batteries (192). In addition to thermal electric (191) other devices such as thermocouples, strain gauges, etc. can be incorporated into the composite (192).

Figure 12A:
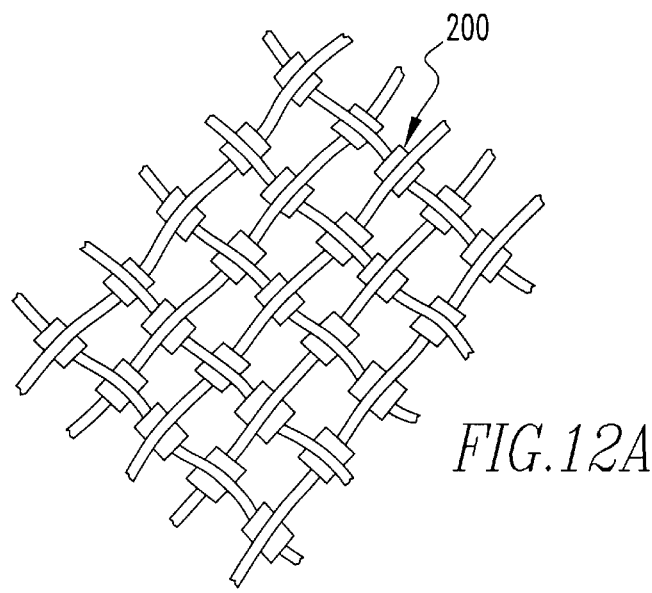
FIG. 12 shows a thermal blanket.
Figure 12B:
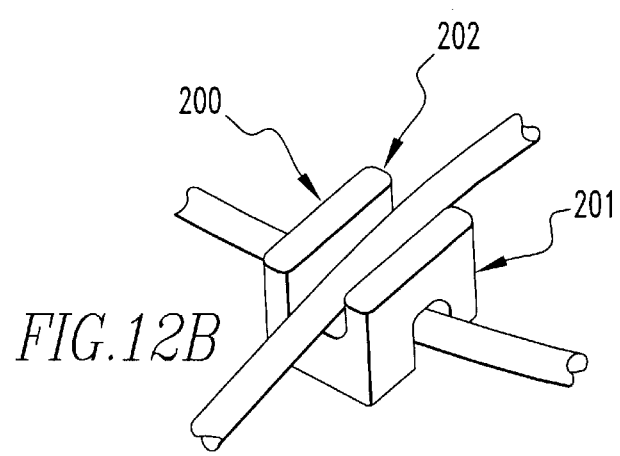

FIG. 12 shows a wire or string separator (200) produced from an elastomeric gel composite (201). By changing the durometer of the elastomeric gel composite (201) the forces exerted on the strings or wires from one to another may be dampened. String separator (200) may also be used to electrically isolate wire mesh or sensor arrays or to add capacitance or act as a thermocouple or electrical bridge between wires.

The string separator (200) may also be used for racquet strings such as tennis or racquetball strings to help induce spin and dampen vibration. The peaks (202) may be raised to grab the ball and to help induce spin. In addition, different color separators (202) may be used to provide identification or create patterns on a racquet, or indicate location. For example, a circle may be made in a specific area to indicate the sweet spot of a racquet.

In addition to these, many other applications can be developed such as flexible fishing lures, flexible electrical conductors and seals, shock absorbing and impact resistant clothing for police, military, motorcycle riders, rollerbladers, etc. In addition, weight belts or a containment belt may be designed to hold the hand or other weights when not being used for exercise on an appendage.

There are many applications which may be developed using elastomer gel composites from weighted balls for exercise, to medical products.

FIG. 13 shows a number of applications for reinforced thermoplastic elastomeric gels (RTEG's) including a ball, glove with inserts, and weighted gloves.

Figure 13A:
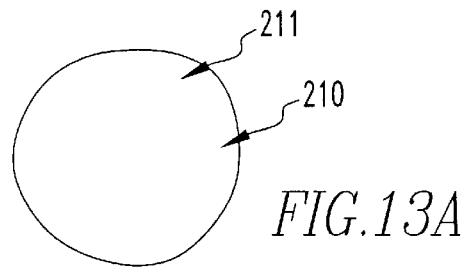
FIGS. 13A through 13C show a number of applications for reinforced thermoplastic elastomeric gels (RTEG's) including a ball, protective gloves, and weighted gloves.

FIG. 13A shows a ball (210) composed of a RTEG. The reinforcement may be a fiber to help hold the balls shape or it may be a high density material to add weight. The ball (210) may include more than one layer of material with one or more layers being reinforced. The ball may also include a covering (211) such as a cloth, leather or other coating such as a polymer to provide friction and wear resistance.

Figure 13B:
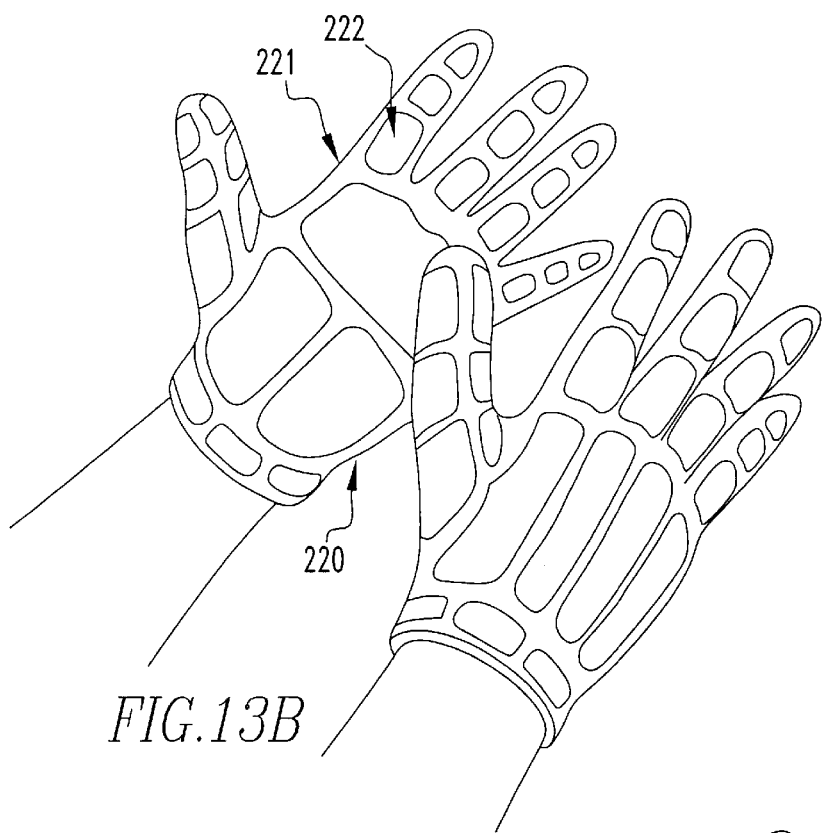

FIG. 13B shows RTEG gloves (220). These gloves have a fabric covering (221) in which reinforced material (222) is contained. With the use of a low durometer thermoplastic gel, the material may be sewn directly through the RTEG. The reinforced material (222) may be padded to absorb shock or impact or the material may be a weight when high density reinforcement is used. The soft, flexible nature of the RTEG provides a soft, comfortable fit.

Figure 13C:
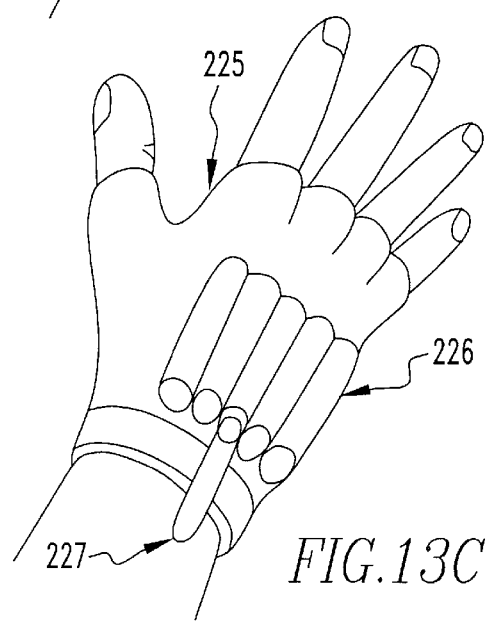

FIG. 13C shows a cloth glove (225) with pockets (226) into which flexible reinforced thermoplastic elastomeric gel (RTEG) weight inserts (227) may be inserted. This system makes it possible to have a soft, adjustable weight system. The gloves shown in FIG. 13B or 13C may be used with metal reinforcement to provide heat therapy for sore muscles or joints. For example, the gloves may be heated in an oven or microwave and then worn to provide thermal relief and good intimate contact on the hands. In addition, along with oil, medicines may be added to the polymer mix such that these materials bleed out while the gloves (226) are being worn.

FIG. 14 shows body wear which may be created with RTEG to provide impact protection as well as weight for different parts of the body.

Figure 14B:
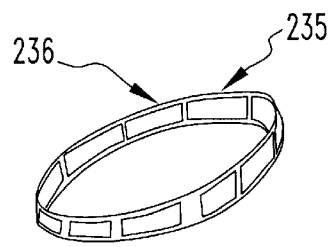
FIGS. 14A through 14F show body wear which may be created with reinforced thermoplastic elastomeric gels (RTEG's) to provide impact protection.
Figure 14A:
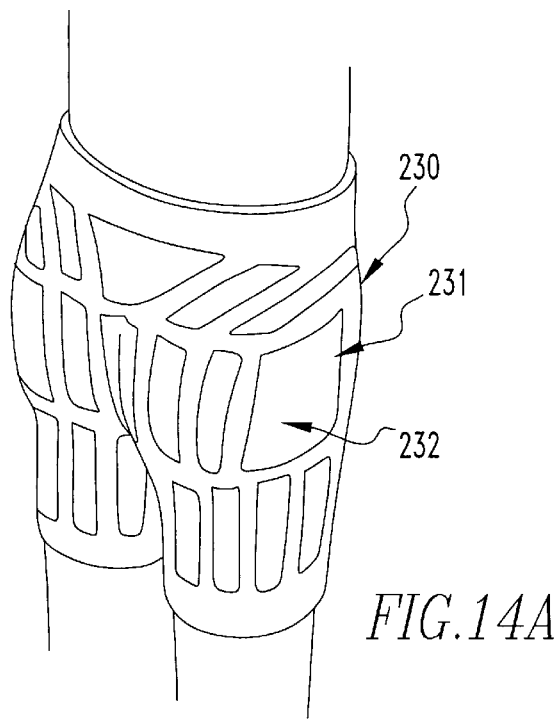

FIG. 14A shows a pair of shorts (230) with sewn in RTEG inserts (231) for impact resistance to protect the body in the case of falls. The material may also contain high density reinforcements to act as a weight. The fabric covering (232) may include abrasion resistant fabric made with nylon, or kevlar. Skip pads of metal or plastic may also be included on the exterior.

FIG. 14B is a belt (235) containing RTEG's which may contain high density reinforcement the reinforcement may contain thermal reinforcement to treat back pain, and act as a weight belt or it may have inserts and act as a support belt (236) for lifting.

Figure 14C:
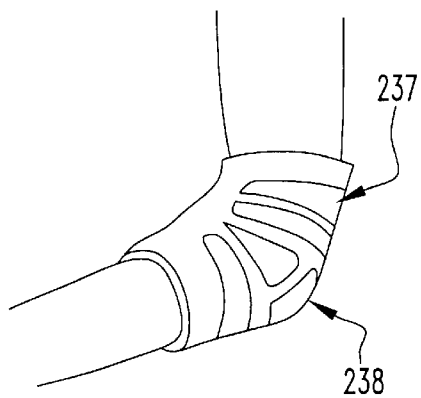

FIG. 14C shows an elbow pad (237) containing reinforced elastomeric gel (238) for impact resistance.

Figure 14E:
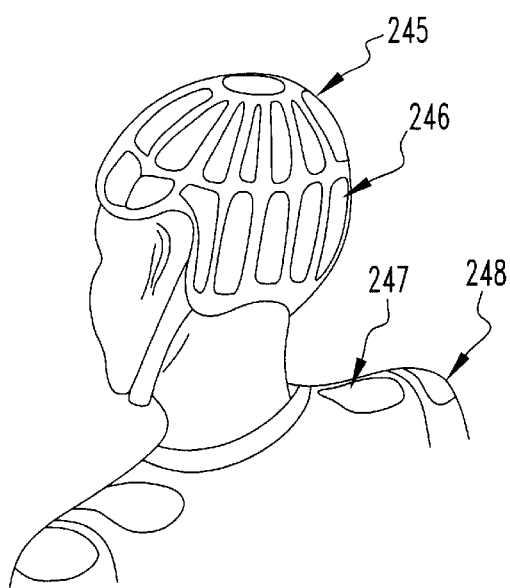
Figure 14F:
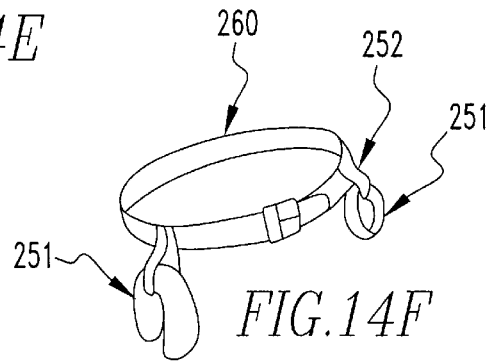
Figure 14D:
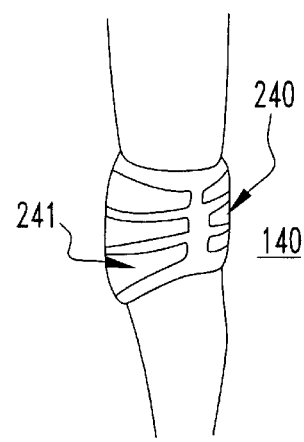

FIG. 14D shows a knee protector (240) with RTEG inserts (241).

FIG. 14E shows a flexible, soft helmet (245) containing RTEG inserts (246) to provide impact protection for the head. A hard shell may also be used over these inserts. In addition, FIG. 14E shows similar impact resistant pads (247) which may be attached or sewn into other articles of clothing such as a shirt (248).

FIG. 14F shows a belt (250) which can be used to attach and hold weights (251) such as hand or leg weights when they are not being used on the hands or legs. The belt (250) includes attachment loops (252) for attaching the weights (251) to the belt (250). This belt (250) may be used to carry weights in the event that a person becomes tired and unable to continue using the hand or leg weights on that particular appendage.

Figure 15:
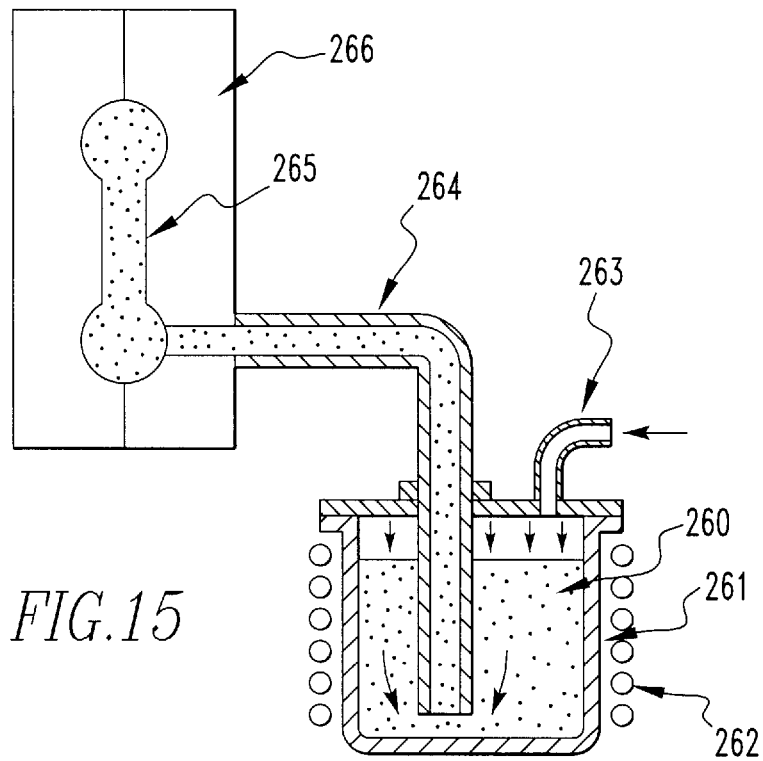
FIG. 15 shows a process for forming low viscosity RTEG's with low pressure casting.

FIG. 15 shows a process for forming low viscosity RTEG's with low pressure casting. Liquid reinforced thermoplastic elastomeric gel (260) is held in a pressure vessel (261) that is heated to a desired temperature above the liquidous of the polymer with heating elements (262). The pressure vessel (261) may also contain mixing blades, not shown. Gas is then forced into the pressure vessel through a gas inlet port (263) such that the gas pushes on the surface of the liquid RTEG (260) forcing it into a feed tube (264) and into a mold cavity (265) in an injection mold (266).

Figure 16:
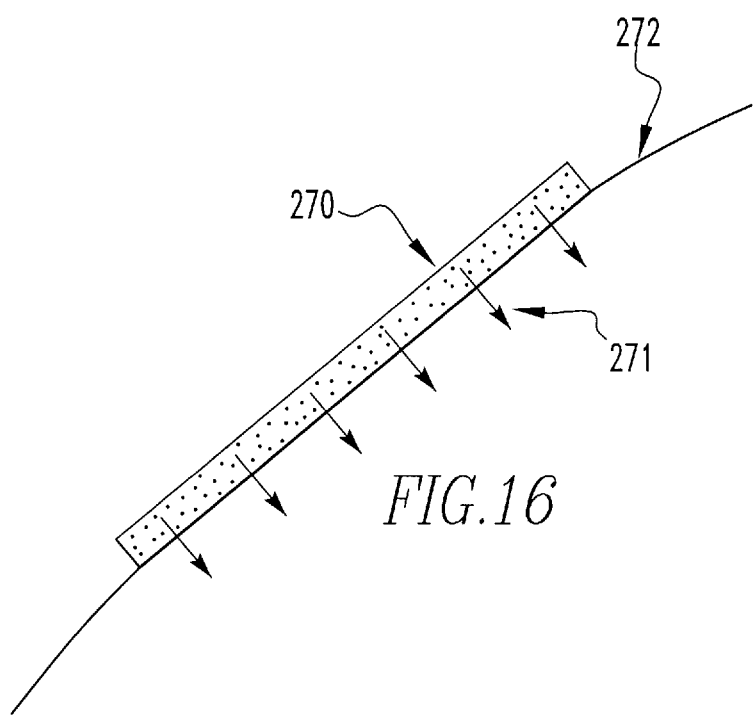
FIG. 16 shows the use of a reinforced thermoplastic elastomeric gel directly on the skin, to supply medicine to the skin or body.

FIG. 16 shows the use of a RTEG directly on the skin. It shows an elastomeric gel composite (270) which contains hydrocortisone and Aloe for treatment of skin psoriasis. By overloading the polymer, drugs and oil will bleed out as shown by arrows (271) and come in contact with the skin (272). This system can provide effective treatment for burns, poison ivy and other skin ailments. In addition, the gel may be used to hold drugs for the treatment of other problems requiring continuous administration of drugs as required with some heart conditions. The RTEG (270) may be encased in a package or cloth covering with a means to hold the RTEG (270) such that it naturally adheres to the skin.

Reinforced thermoplastic elastomeric gels can be produced a number of different ways. The following discloses a few of these systems.

Thermoplastic elastomers have been developed over the last 20 years and are available form a number of companies including Monsanto, Shell, Bayer, General Electric, Dow Chemical, etc. In the last few years, a number of companies have developed some thermoplastic elastomers with durometers below 50 shore A. Prior to this, thermoplastic elastomers were typically 50 shore A or higher. These new softer materials were produced through the addition of oils into the polymer. Shell Chemical Company is one of the largest manufacturers of thermoplastic elastomers. Shell produces Kraton®, a line of thermoplastic elastomers ranging from 50-100 shore A durometer as well as a line of elastomers compounded with oil with durometers down as low as 28. Kraton® and most thermoplastic elastomers can be compounded with 1-99.9+ percent oil. Each elastomer has different abilities to maintain the oil within its molecular structure, some can accept more than others. Typically, the greater the oil content, the lower the durometer as well as the molten polymer viscosity. Gels below 1 shore A can be formed with high percentages of oil, and are very similar to human skin. More than one thermoplastic elastomer, oil, and other additives may be used to create an elastomer with the desired properties while still holding the oil within the polymer. Shell Chemical Company Technical Bulletin SC-1102-89 titled "Kraton Thermoplastic Rubbers in Oil Gels" discloses the background on a few of the possible systems that may be created. This document is incorporated by reference herein. Thermoplastic elastomeric gels are considered those polymers which have a durometer less than 50 shore A and have oil contained within their structure.

Thermoplastic elastomeric gels (TEGS) are available in durometers down to 28 shore A from Shell Chemical Company, as well as a number of other companies. In addition, there are a number of compounders which supply even lower durometer materials down to and below 2 shore A. Consolidated Polymer Technologies, Inc. in Largo, Fla. sells a line of Styrene and Butylene elastomer compounded with silicon and other oils to durometers down to 5 shore A. GLS Corporation, Chicago, Ill., sells a line of similar TEGS with durometers down to 2 shore A.

These TEGS may be melt blended or infiltrated into reinforcement to create the composites disclosed. In addition, other thermoplastics may be used and melt blended with oil and reinforcement at the same time to create a reinforced thermoplastic elastomer gel (RTEG). The reinforcement adds shearing action which makes blending in the oil easier and the system more fluid. Oil may also be added to precompounded TEGS to further lower their durometer. When the system becomes saturated, it cannot hold any more oil and the oil may separate when the system is molten or slowly bleed out of the solidified polymer. Different stabilizers can be added to help maintain the oil in suspension in the heated liquid polymer and the solidified polymer. The small particles of reinforcement fit into the same locations within the polymer chains as the oil and therefore can also affect the amount of oil which can be maintained within the polymer system.

This invention discloses the concept of fitting reinforcement between the long polymer chains that exist in thermoplastic. Branched long chains are preferred because the spaces are large between the chains and more material can fit within the spaces between the chains. During deformation, the small particles of reinforcement remain suspended between the chains without shearing the chains. Small size particles are required to fit between the chains. If the particles are too large, the chains become broken and tear apart upon deformation. If the particles fit within the spaces between the chains it is possible to maintain the same or close to the same elastic properties as compared with the unreinforced polymer. Large reinforce over 300 microns does not fit within the polymer chains and become dislodged easily during deformation. In addition, large particles do not remain suspended in the heated liquid polymer, they tend to settle out rapidly. Particle sizes below 20 microns fit readily within most thermoplastic chains.

The addition of oil acts to separate the chain and allows them to slide relative to each other. The oil also occupies the same space between the chains. Reinforce may be fit within the chains of almost any thermoplastic with branched chains, but the addition of reinforcement blocks movement between the chains, and makes the polymer act much stiffer. With a thermoplastic over 50 shore A the reinforce additions must fit within smaller spaces between the chains, and with small additions, the flexibility rapidly diminishes, and little to no flexibility exists.

The addition of oil helps to maintain the small particles between the chains. The oil also fits within the chains and increases the space between them. The oil easily wets the small reinforcement particles and forms a lubricating coating on them. Since the oil and reinforcement occupy the same space there are limits on the amount of oil and reinforcement that may be added. Too much reinforcement results in the breaking of polymer chains and reduction in elongation and other properties. Too much oil results in the oil bleeding out or separating from the material.

The oil lowers the durometer of the material and makes it easier for the reinforcement to fit and be maintained within the chains in both the liquid and solid states, and helps maintain the particles during deformation. The oil also acts to prevent metal reinforcement from oxidizing or rusting. For example, it keeps iron particles from rusting.

To create this composite material, the particles must become positioned between the chains. To accomplish this, the polymer must be heated to allow the chains to move. Reinforcement must then be forced between the chains. To accomplish this, the reinforcement must also be heated to near or above the melting point of the thermoplastic. Without this heating, the polymer chains will stop moving when they contact the reinforcement.

The oil may be precompounded as the thermoplastic elastomer or the reinforcement prior to mixing the whole system together. It is preferred to precompound heated oil and heated thermoplastic and then slowly make additions of heated reinforcement to the heated liquid polymer/oil mixture. This gives the reinforcement time to move in between the polymer chains.

This compounding may be done with standard mixing equipment used in the baking or plastic industry. Ross Planetary Mixers used in mixing large volumes of heated materials such as paints and some baked goods maybe used. Oil heating is required to heat the mixing chamber. Heaters may be purchased from Mokon or other companies.

Continuous Mixers may also be used as available from Teledyne in York, Pa. Continuous mixers are typically used for mixing pasta or other food products. Electric or oil heating is also required for continuous mixers. Single or twin screw extruders/mixers used for plastics may also be used to compound the reinforcement, oil, plastic, and thermoplastic. Highly loaded or abrasive reinforcement may damage machines with screws. One of the reasons for this is that reinforcement cannot be added slowly into a screw to form the material in one operation.

To produce the material described in this invention with a screw the thermoplastic should first be compounded with the oil and then the reinforcement should be slowly added in multiple passes through the screw.

The following examples may be used to produce reinforced thermoplastic elastomeric gel (RTEG) for a number of applications. The RTEG variations are limitless and should be developed with the desired properties for a specific application. The producing of unreinforced thermoplastic elastomeric gels is fairly well known. There are a large variety of thermoplastics and elastomers which may be made into gels. A number of thermoplastic rubbers are provided in the Elastomer Technology Handbook 1993 from CRC Press, this publication is incorporated by reference herein.

EXAMPLE ONE

FIG. 1 shows a dumbbell with a hand strap formed from reinforcement, thermoplastic elastomer, and oil mixed together and cast. In this case, the reinforcement is selected based on its density, safety, and cost. Iron, lead, tungsten, and copper are some of the possible candidates. Iron, however, has many benefits even though it is not that dense because it is low in cost and does not have some of the safety concerns of lead. The shape of the reinforcement must then be selected. Very small particles below 300 microns stay suspended inside the polymer when the gel is liquid and they remain suspended after solidification and during deformation and elongation.

Larger particles can only be used with systems that will not be flexed. Flexing will cause the large particles to come out of the polymer. Shot size are 0.080 inches in diameter or larger and tend to settle out of the polymer when it is liquid and they separate and fall out of the polymer during flexure. Iron particles from 1 to 100 microns remain suspended within the polymer during mixing and during flexure. The oil helps to wet the particles and prevent them from separating from the polymer.

Once the mold is made and the volume of the weight is known, the amount of reinforcement and polymer may be determined based on the desired density of the weight. The durometer of the weight may be controlled to some extent by the elastomer selected, the amount of oil added, the size and shape of the reinforcement, and the volume fraction of reinforcement versus polymer. The greater the volume fraction of reinforcement, the stiffer the solidified composite and the higher its durometer.

If the volume of the dumbbell is 500 cubic centimeters, and its desired weight is 4 pounds or 1,814.4 grams, the correct mixture may be developed based on the density of each material. Using iron particulate with a density of 7.9 grams per cubic centimeter and a gel with a density of 0.9 grams per cubic centimeter. 1,540.6 grams of iron particulate, 0.85 weight percent, or 0.39 volume percent iron must be combined in 274 grams of thermoplastic/oil combination, 0.61 volume percent of the weight, 0.18 weight percent of the weight.

Iron particulate may be obtained from many sources for this example, iron dust may be obtained from U.S. Metals, which is less than 300 microns in diameter. A Kraton compound already mixed with oil available from GLS Corporation and sold as Dynaflex GX-6703 with a shore A of 5. A planetary mixer was preheated to 380° F. into which the iron particulate and pelletized polymer were placed. The materials were allowed to heat for 10 minutes and the blades were turned on low. After 10 minutes, the mixture was uniform and was removed from the mixer and solidified on a glass plate. Then the mixture was granulated in a grinder from IMS, Chagrin Falls, Ohio. Then the mixture was run through an extruder and cut into small pellets. The pellets were then loaded into an injection molding machine and injected into a dumbbell mold. The resulting dumbbell has a durometer of 15 shore A and is much safer than a standard iron or rubber coated iron dumbbell.

Other weights can be produced in a similar manner. The weights shown in FIG. 5 through 9 were created with a durometer below 1 shore A by adding additional oil such as mineral oil and compounding into the system in the mixer or extruder.

Shell Chemical Company has a large number of elastomers which may be used and mixed with additional oil to reach the desired viscosity. These materials are listed in Shell Chemical Company "Kraton—Typical Properties" Data Booklet SC: 68–92. This publication is incorporated by reference herein.

EXAMPLE TWO

A fiber reinforced pad for impact protection may be produced by infiltrating a thermoplastic elastomeric gel into a preform of reinforcement. FIG. 2 shows a process where a woven fabric is placed into a mold and then infiltrated with liquid thermoplastic elastomer to form a composite. To accomplish this, fibers or particulates may be preformed into a desired shape. For example, fibers may be woven into a fabric which is then cut to fit with a mold cavity. Particulate may also be preformed by pressing, and other means. After the preform is formed, it may be preheated or loaded cold into an injection mold cavity. Liquid elastomer is then forced into the die cavity. Particulate reinforcement may also be poured into a mold and then infiltrated.

C-Flex 5 shore A material available from Consolidated Polymer Technologies, and has already been mixed with oil to form a gel, may be injected at 1,000 to 1,500 psi into a die cavity at 100° F. With the polymer at 390° F., such that the liquid polymer surrounds the reinforcement and infiltrates the spaces between the reinforcement. The injection and infiltration process must be done quickly before the polymer solidifies. The infiltration pressure and speed required depends on the size and shape of the interconnected pour structure and the temperature and wetability of the materials.

EXAMPLE THREE

A low viscosity liquid, reinforced thermoplastic elastomeric composite may be formed which may be poured or low pressure cast into a mold to form a low durometer composite.

Kraton rubbers such as G-1650 (or any other Kraton Dorg rubbers) may be mixed with oil such as white mineral oil, Duoprime 200, available from Lyondell Lubricants, (or any other oil such as vegetable or silicon oil), to reduce its durometer. With the addition of over 15 percent oil, the viscosity rapidly drops and the heated mixture may be easily poured into a mold. Without oil, these thermoplastic rubbers have extremely high viscosity, typical with thermoplastics and their viscosities are sheer dependent. With the oil addition, over 15 percent, the sheer dependence drops off to zero. Up to 95 percent oil may be polymerized into a gel.

One pound, 50 percent, G-1650 is heated along with one pound, 50 percent Duoprime 200 to a temperature of 370° F. in a 5 gallon stainless steel planetary mixer for 15 minutes. The mixer is then turned on low for 10 minutes until compounded. Five pounds of 1–10 micron iron powder is preheated in a furnace to 400° F. and slowly added to the liquid polymer oil mixture with the blades turning slowly the powder is added over 5 minutes to make sure the polymer mixes completely. The oil prevents the powder from rusting. The resulting mixture can be poured into a mold and solidified to form a component with a durometer below 2 shore A.

This invention discloses the concept of a composite which consists of a reinforcement distributed throughout a thermoplastic to form a unique material with a durometer of less than 50 Shore A. The low durometers are created with the addition of oil to an elastomer to create a gel. In the preferred embodiment particulate between 1–300 microns is used so that it remains in suspension in the liquid and solid states of the thermoplastic. The small particles are held within the polymer chains. The wetting between the particles and elastomer is enhanced by the oil contained in the elastomer. Alternatively, chopped or continuous fibers may be used as reinforcement. Fibers with greater than a one micron diameter and a ten micron length, can be used to help control elongation of the composite. The reinforcement may be comprised of one or more substances including metals, ceramics, plastics, or forms of carbon such as graphite or diamond.

The composite can be formed by heating the thermoplastic, oil and reinforcement and then mixing them together to create a distributed system with a durometer of less than 50 Shore A. Woven fibers made of plastic, glass, metal, ceramic or a form of carbon may be embedded into the elastomer to create a composite with controlled elongation. Many different thermoplastics may be used, including thermoplastic rubbers known elastomers. In the preferred embodiment, the thermoplastic includes styrene and butylene polymers. A woven fabric may be infiltrated to create the composite. This type of composite is ideal for use as padding to protect the body. During impact, the fibers maintain the elastomer gel in position, but allow deformation and shock absorption. One or more layers of woven fibers may be used.

Particulate reinforcement may be used over 300 microns in diameter in systems where only small amounts of deformation or elongation will occur. Large particles do not fit within the chains and may become dislodged during deformation.

More than one size particle may be used to reduce viscosity of the liquid polymer reinforcement mix. This makes the material flow much easier into a mold. In addition, materials may be added to create gas in the liquid mix which results in hollow spherical voids in the formed composite component. These voids can be used to add additional shock absorption and reduce the gross durometer of the component.

In addition to reinforcement, inserts may be formed in the elastomer or composite by placing them in a mold and forming the component around them. The inserts may be used as stiffeners or other devices and may be comprised of metal, plastic, ceramic or form of carbon. In addition, the inserts may be comprised of one or more substances such as a polymer coated metal insert.

In many instances, a fabric or other elastic or non-elastic covering may be preferred to contain and support the composite. Many different materials may be used including natural and synthetic fabrics, leather, etc.. Lycra/Spandex™ is one material that provides excellent support and stretch.

This type of low durometer composite has many applications including dampening mechanisms. For example, a composite string or wire separator may be formed to prevent two or more overlapping strings or wires from contacting each other. In addition, the separator may be used to dampen shock or vibration between the strings or help grab an object such as a ball to induce spin. Conductive magnetic or resistive materials may be used as reinforcement to create affect between wires.

Typically, in the case of a weight, the reinforcement will be a high density material greater than one gram per cubic centimeter. Polymer materials themselves typically have a density of less than one gram per cubic centimeter. Many different weights can be created.

One particular weight is positioned between the knuckles and wrist and wraps around the hand between the thumb and fingers and into the palm and includes a strap to connect the palm section back to the knuckle section to hold the weight on the hand. In the preferred embodiment, this weight has a durometer of less than 20 shore A and is more comfortable with a durometer of less than 10 shore A. This weight in the preferred embodiment is covered with a fabric to provide a softer interface between the hand and composite material. The weight may contain reinforcement in the palm area or the knuckle area or both. The weight may also be positioned in the wrist strap. It may also contain weight continuously dispersed between the knuckle and the section between the thumb and fingers as well as the palm. The fabric used to cover the weight may include a flap to insert the weight inside, or the weight may be stitched around or through to enclose the weight in fabric. Fasteners such as locks, straps, D-rings, laces and hook and loop material may be used to attach additional weight.

The fabric which covers a weight may go around part of the body and include a method of fastening the weight to the body. Typically, the weights will be worn on some portion of an arm or leg and more specifically on a hand, wrist, or ankle, however, other locations on the body may be used. The weights may also be positioned in or on other articles of clothing. For example, the weight may be used as an insert, in a shoe or act as a pad in a shoe or it may be attached to the laces. The composite may be fastened to another object with a strap or it may be inserted into a pocket. A weighted insert may contain woven fibers and it may act as a cushion. Composite weight material typically has a reinforcement with greater than four grams per cubic centimeter density.

In addition to the weights already disclosed, standard weights may be formed from a reinforced thermoplastic composite such as dumbbells with handles, weight plates for use on bars and almost any other type of weight that is currently made of a solid metal or metal shot.

If the weights are worn but the appendage to which they're attached becomes tired, the weights may be taken off that appendage and attached to a belt to hold the weight until the person is ready to continue exercising. For example, if a person is walking with the weights on their arms and their arms become tired, they may take the weights off and put them on the belt and continue on.

An elastomeric gel composite is ideal for protecting the body. For example, a composite material with a woven fabric such as Kevlar fiber material infiltrated with an elastomeric gel can be formed into a bullet proof article of clothing, such as a bullet proof vest. The elastomer supports the Kevlar fiber and helps distribute the impact and provide a comfortable conforming interface between the material and the body.

Reinforced elastomeric gels may also be used for pressure seals between high or low pressure sealing items, that are ideal for low pressure seals, such as a door on a car or a vacuum seal where low pressures or vacuums must be sealed between different areas. The low durometer provides a seal with low pressure while the reinforcement maintains the shape of the seal. The reinforcement may be chopped or woven fibers which may be randomly oriented or oriented in specific directions to reduce or prevent unwanted elongation.

The reinforcement may also be used to make the composite act as a thermal or electrically conductive device. For example, with the addition of metal powder, the composite may be used to change the temperature of an object. For example, the composite material may be heated in microwave or oven and then laid on the object or a persons body to heat it. The composite, having a low durometer easily conforms and provide good intimate contact. In addition, heating elements or cooling elements may be incorporated into the composite to control its temperature.

Other items may be added to the composite such as stabilizers, colorants, perfumes or coatings may be applied to the composite such as talc or paint to change its surface properties. Abrasion resistant materials such as graphite or ceramics may be added to the elastomeric gel to act as a reinforcement for a flexible shock absorber, bumper or skid pad.

The composite can include abrasive material such as a ceramic or carbide and can be formed or cut such that the reinforcement is exposed on the surface. The composite may then be used as a flexible cutting tool such as a sanding block or grinding wheel. As the surface wears, more reinforcement becomes exposed and allow continuous use unlike sandpaper.

The composites disclosed may be formed into a shape by injection molding, gravity, casting, or low pressure casting. Typically, the reinforcement will be added to the liquid polymer and then mixed. High oil contact elastomers with reinforcement may be gravity poured or injected with a low pressure injection molding equipment. Such machines are available for wax casting.

Alternatively, they may be created by infiltrating the liquid elastomeric gel into reinforcement pre-loaded into a mold. The reinforcement may be formed into a shape called a preform prior to loading into the casting mold. Many preforming methods exist including weaving, pressing, or injection molding. Additives may be used such as adhesives or coatings to help stick the reinforcement together to maintain its shape as a preform. Preforms are porous with an interconnected void structure to allow a liquid to flow in the void spaces. By leaving large open areas in the preform, unreinforced areas may be created in the composite component during infiltration. In this manner, different systems may be created in one part, alternatively, an insert of composite may also be infiltrated around or injected around to create more than one material system in a component.

None of these examples are meant to limit the scope of this invention.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A composite comprising:

reinforcement of solid particles of ceramic or metal greater than or equal to 1 micron in size; and a thermoplastic elastomer having polymer chains, said reinforcement is distributed throughout and between the polymer chains, the composite having a durometer less than 50 shore A.

2. A composite as described in claim 1 wherein the particulate has a diameter of 1–300 microns.

3. A composite as described in claim 1 wherein the reinforcement is over three hundred microns in diameter.

4. A composite as described in claim 1 wherein the reinforcement has more than one particle size to reduce viscosity.

5. A composite as described in claim 1 formed in the shape of a hand weight.

6. A composite as described in claim 1 with additives of colarants, perfumes, talc or paint to enhance the composite.

7. A composite as described in claim 1 wherein the particles are greater than or equal to 1 micron in size and less than or equal to 300 microns in size.

* * * * *